US009489795B2

(12) United States Patent
Adiraju

(10) Patent No.: US 9,489,795 B2
(45) Date of Patent: Nov. 8, 2016

(54) CONTROLLING MECHANICAL OUTCOME INDICATORS OF GAMING MACHINES

(71) Applicant: WMS Gaming Inc., Waukegan, IL (US)

(72) Inventor: Srinivyasa Murthy Adiraju, Vernon Hills, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 14/294,720

(22) Filed: Jun. 3, 2014

(65) Prior Publication Data

US 2015/0348361 A1 Dec. 3, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ......... *G07F 17/3213* (2013.01); *G07F 17/326* (2013.01); *G07F 17/3244* (2013.01); *G07F 17/34* (2013.01)

(58) Field of Classification Search
CPC ............................ G07F 17/34; G07F 17/3213
See application file for complete search history.

(56) References Cited

U.S. PATENT DOCUMENTS 5,971,271 A 10/1999 Wynn .......................... 235/380
6,113,098 A 9/2000 Adams ...................... 273/143 R
6,183,362 B1 2/2001 Boushy .......................... 463/25
6,379,246 B1 4/2002 Dabrowski ...................... 463/16
6,394,907 B1 5/2002 Rowe ............................. 463/42
6,585,589 B2 7/2003 Okuniewicz .................... 463/17
6,866,586 B2 3/2005 Oberberger ..................... 463/42
6,913,534 B2 7/2005 DeFrees-Parrott ............. 463/17
7,311,605 B2 12/2007 Moser ............................ 463/25
7,335,106 B2 2/2008 Johnson .......................... 463/42
7,419,427 B2 9/2008 Boushy ........................... 463/25
7,419,428 B2 9/2008 Rowe .............................. 463/25
7,526,447 B2 4/2009 Rowe .............................. 705/39
7,686,687 B2 3/2010 Cannon ........................... 463/25
7,749,081 B1 7/2010 Acres .............................. 463/31
7,762,888 B2 7/2010 Rowe .............................. 463/29
7,867,095 B2 1/2011 Mattice ........................... 463/46
7,871,325 B2 1/2011 Okuniewicz .................... 463/16
7,905,780 B2 3/2011 Morrow .......................... 463/31
7,922,577 B2 4/2011 Okuniewicz .................... 463/25
7,950,999 B2 5/2011 Morrow .......................... 463/31
7,985,129 B2 7/2011 Okuniewicz .................... 463/17
7,993,197 B2 8/2011 Kaminkow ...................... 463/25
7,997,981 B2 8/2011 Rowe .............................. 463/27
8,029,364 B2 10/2011 Loose ............................ 463/42

(Continued)

*Primary Examiner* — Kevin Y Kim
(74) *Attorney, Agent, or Firm* — Marc D. Thompson

(57) ABSTRACT

The present invention describes a system having a gaming machine using game circuitry logic and a primary controller to perform a primary wagering game. The system may further include a secondary controller using mechanical components of the gaming machine to perform secondary wagering games. The secondary controller is configured to actuate and control mechanical components of the gaming machine system controlled by the primary controller. The secondary controller further combines output of the primary and secondary wagering games to generate a unified graphical user interface displayed on a display device of the gaming machine. The secondary controller also actively translates input and output coordinate data between each of the primary and secondary controller graphical user interfaces and the unified graphical user interface.

20 Claims, 8 Drawing Sheets

(56) References Cited

U.S. PATENT DOCUMENTS

| | | | | |
|---|---|---|---|---|
| 8,070,590 | B2 | 12/2011 | Cannon | 463/20 |
| 8,083,592 | B2 | 12/2011 | Wells | 463/42 |
| 8,088,000 | B2 | 1/2012 | Ginsberg | 463/25 |
| 8,088,009 | B2 | 1/2012 | Finnimore | 463/42 |
| 8,088,014 | B2 | 1/2012 | Wells | 463/46 |
| 8,092,303 | B2 | 1/2012 | Amaitis | 463/29 |
| 8,113,956 | B2 | 2/2012 | Finnimore | 463/42 |
| 8,133,102 | B2 | 3/2012 | Dabrowski | 463/1 |
| 8,135,644 | B2 | 3/2012 | Rowe | 705/39 |
| 8,162,756 | B2 | 4/2012 | Amaitis | 463/42 |
| 8,241,119 | B2 | 8/2012 | Wells | 463/30 |
| 8,241,123 | B2 | 8/2012 | Kelly | 463/34 |
| 8,241,124 | B2 | 8/2012 | Kelly | 463/34 |
| 8,246,431 | B2 | 8/2012 | Amaitis | 463/6 |
| 8,282,480 | B2 | 10/2012 | Wells | 463/31 |
| 8,298,089 | B2 | 10/2012 | Merati | 463/43 |
| 8,308,568 | B2 | 11/2012 | Amaitis | 463/42 |
| 8,317,604 | B2 | 11/2012 | Wells | 463/25 |
| 8,319,601 | B2 | 11/2012 | Gelman | 340/52 |
| 8,323,102 | B2 | 12/2012 | Lutnick | 463/29 |
| 8,323,111 | B2 | 12/2012 | Finnimore | 463/42 |
| 8,336,697 | B2 | 12/2012 | Wells | 194/202 |
| 8,342,935 | B1 | 1/2013 | Morrow | 463/20 |
| 8,348,759 | B2 | 1/2013 | DiMichele | 463/31 |
| 8,357,039 | B2 | 1/2013 | Anderson | 463/29 |
| 8,371,937 | B2 | 2/2013 | Wells | 463/29 |
| 8,371,942 | B2 | 2/2013 | Finnimore | 463/42 |
| 8,388,424 | B2 | 3/2013 | Dabrowski | 463/1 |
| 8,419,526 | B1 | 4/2013 | Cannon | 463/25 |
| 8,425,310 | B2 | 4/2013 | Soukup | 463/25 |
| 8,430,741 | B2 | 4/2013 | Agarwal | 463/20 |
| 8,475,261 | B2 | 7/2013 | Little | 463/20 |
| 8,475,273 | B2 | 7/2013 | Kelly | 463/36 |
| 8,491,366 | B2 | 7/2013 | Amaitis | 463/6 |
| 8,500,529 | B2 | 8/2013 | Amaitis | 463/6 |
| 8,512,129 | B2 | 8/2013 | Ginsberg | 463/25 |
| 8,512,144 | B2 | 8/2013 | Johnson | 463/42 |
| 8,715,073 | B2 | 5/2014 | Adiraju | 463/31 |
| 2004/0248640 | A1* | 12/2004 | Kaminkow | G07F 17/34<br>463/20 |
| 2007/0243925 | A1 | 10/2007 | LeMay | 463/20 |
| 2007/0243934 | A1 | 10/2007 | Little | 463/40 |
| 2008/0009344 | A1 | 1/2008 | Graham | 463/25 |
| 2008/0113802 | A1 | 5/2008 | Johnson | 463/40 |
| 2008/0161107 | A1 | 7/2008 | Johnson | 463/31 |
| 2009/0098943 | A1 | 4/2009 | Weber | 463/42 |
| 2009/0104954 | A1 | 4/2009 | Weber | 463/1 |
| 2009/0137310 | A1* | 5/2009 | McAllister | G07F 17/3209<br>463/20 |
| 2009/0176568 | A1 | 7/2009 | Reddy | 463/31 |
| 2009/0176572 | A1 | 7/2009 | Reddy | 463/37 |
| 2009/0233705 | A1 | 9/2009 | LeMay | 463/25 |
| 2010/0075753 | A1 | 3/2010 | Atkinson | 463/31 |
| 2010/0210353 | A1 | 8/2010 | Gagner | 463/25 |
| 2010/0240455 | A1 | 9/2010 | Gagner | 463/30 |
| 2010/0255900 | A1 | 10/2010 | Ansari | 463/25 |
| 2011/0053672 | A1 | 3/2011 | Gagner | 463/16 |
| 2011/0195792 | A1 | 8/2011 | Wells | 463/43 |
| 2011/0263325 | A1 | 10/2011 | Atkinson | 463/31 |
| 2011/0300925 | A1 | 12/2011 | Adiraju | 463/25 |
| 2012/0108338 | A1 | 5/2012 | Wells | 463/37 |
| 2012/0172111 | A1 | 7/2012 | Parham | 463/22 |
| 2012/0264504 | A1 | 10/2012 | Gagner | 463/25 |
| 2013/0072310 | A1 | 3/2013 | Wells | 463/47 |
| 2013/0203491 | A1 | 8/2013 | Hurley | 463/31 |
| 2013/0225281 | A1 | 8/2013 | Buchholz | 463/29 |

* cited by examiner

CONTROLLING MECHANICAL OUTCOME INDICATORS OF GAMING MACHINES

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

FIELD

Embodiments of the inventive subject matter relate generally to wagering game systems, and more particularly to wagering game systems including manipulation of mechanical gaming machine components using a secondary controller and secondary graphical user interface.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY OF THE INVENTION

According to one aspect of the present invention, a gaming system is described having a display device and game-logic circuitry. The game-logic circuitry includes a primary controller and a secondary controller. The primary controller is configured to receive an input indicative of a wager to play a primary wagering game. In response to the input, the primary controller actuates a mechanical outcome indicator in a first instance to display an outcome of a primary wagering game. The secondary controller is configured to receive an input to generate a command which causes the primary controller to actuate the mechanical outcome indicator in a second instance, thereby displaying an outcome associated with a secondary game.

According to another aspect of the present invention, a computer-implemented method in a gaming system is described. The gaming system includes game-logic circuitry having a primary controller and a secondary controller. The method includes the primary controller receiving an input indicative of a wager to play a primary wagering game. In response to the primary controller receiving an input indicative of a wager to play a primary wagering game, the primary controller actuates a mechanical outcome indicator in a first instance to display an outcome of a primary wagering game. In a second instance, the secondary controller receives an input to generate a command. In response to the input to generate a command, the secondary controller generates a command causing the primary controller to actuate the mechanical outcome indicator to display an outcome associated with a secondary game.

According to another aspect of the present invention, a computer-implemented method in a gaming system is described. The gaming system includes game-logic circuitry. The game-logic circuitry includes a primary controller and a secondary controller. The primary controller is configured to control actuation of a mechanical outcome indicator for a wagering game. The primary controller receives an event list request from the secondary controller. In response, the primary controller sends a list of events to the secondary controller. The secondary controller subscribes to an event in the list of events. In response to the event occurring, the primary controller forwards the event to the secondary controller for processing. In response to the primary controller forwarding the event to the secondary controller for processing, the secondary controller generates a command causing the primary controller to actuate the mechanical outcome indicator.

Additional aspects of the invention will be apparent to those of ordinary skill in the art in view of the detailed description of various embodiments, which is made with reference to the drawings, a brief description of which is provided below.

Figure 1A:
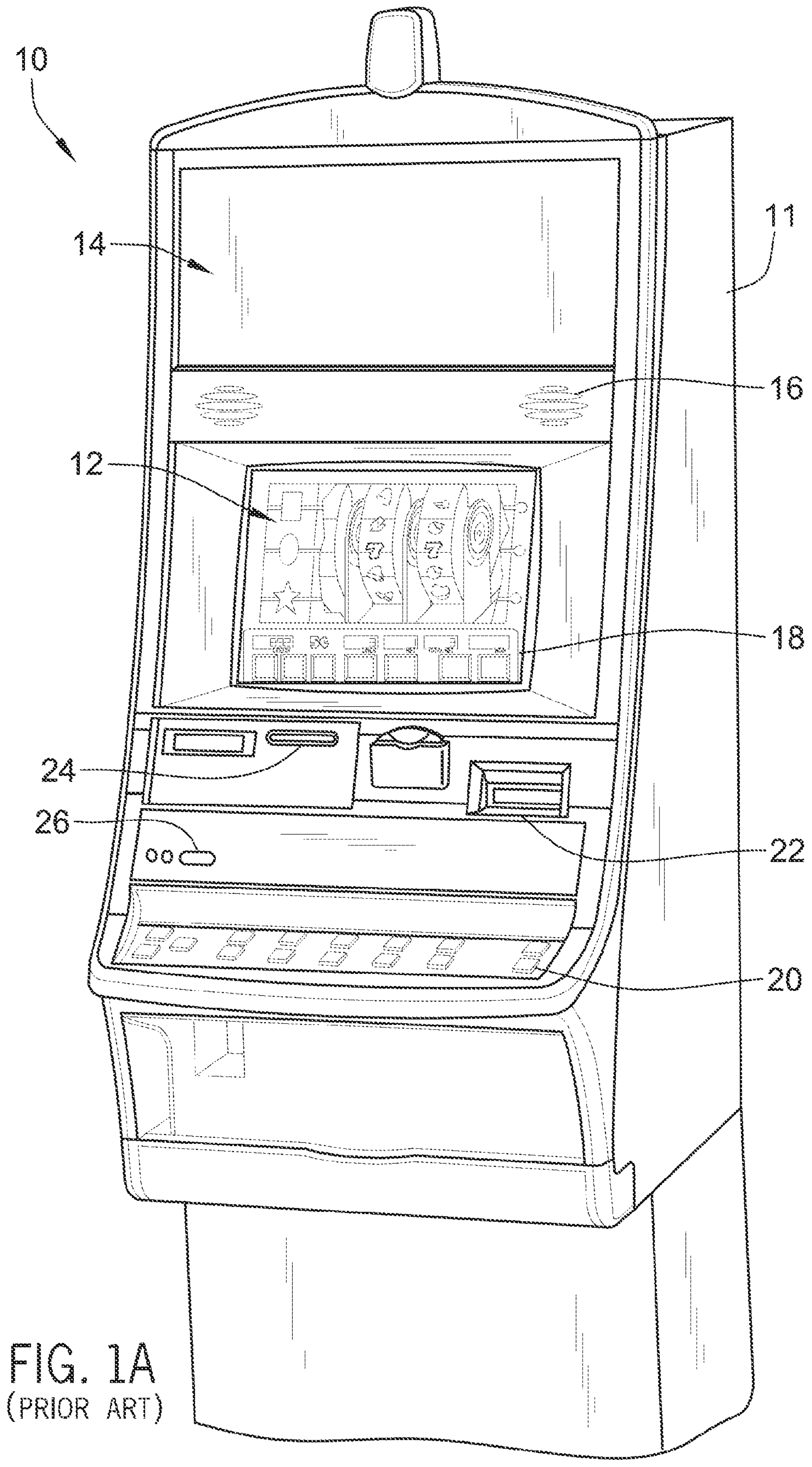
FIG. 1A (PRIOR ART)
FIG. 1A is a perspective view of a free-standing gaming machine according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1A, there is shown a gaming machine 10 similar to those used in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in conducting wagering games, or may include non-dedicated devices, such as mobile phones, personal digital assistants, personal computers, etc. Exemplary types of gaming machines are disclosed in U.S. Pat. No. 6,517,433, U.S. Pat. No. 8,057,204, and U.S. Pat. No. 8,226,459, which are incorporated herein by reference in their entireties.

The gaming machine 10 illustrated in FIG. 1A comprises a cabinet 11 that may house various input devices, output devices, and input/output devices. By way of example, the gaming machine 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

Input devices, such as the touch screen 18, buttons 20, a mouse, a joystick, a gesture-sensing device, a voice-recognition device, and a virtual-input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a game-logic circuitry for processing. The electronic data signals are selected from a group consisting essentially of an electrical current, an electrical voltage, an electrical charge, an optical signal, an optical element, a magnetic signal, and a magnetic element.

Figure 1B:
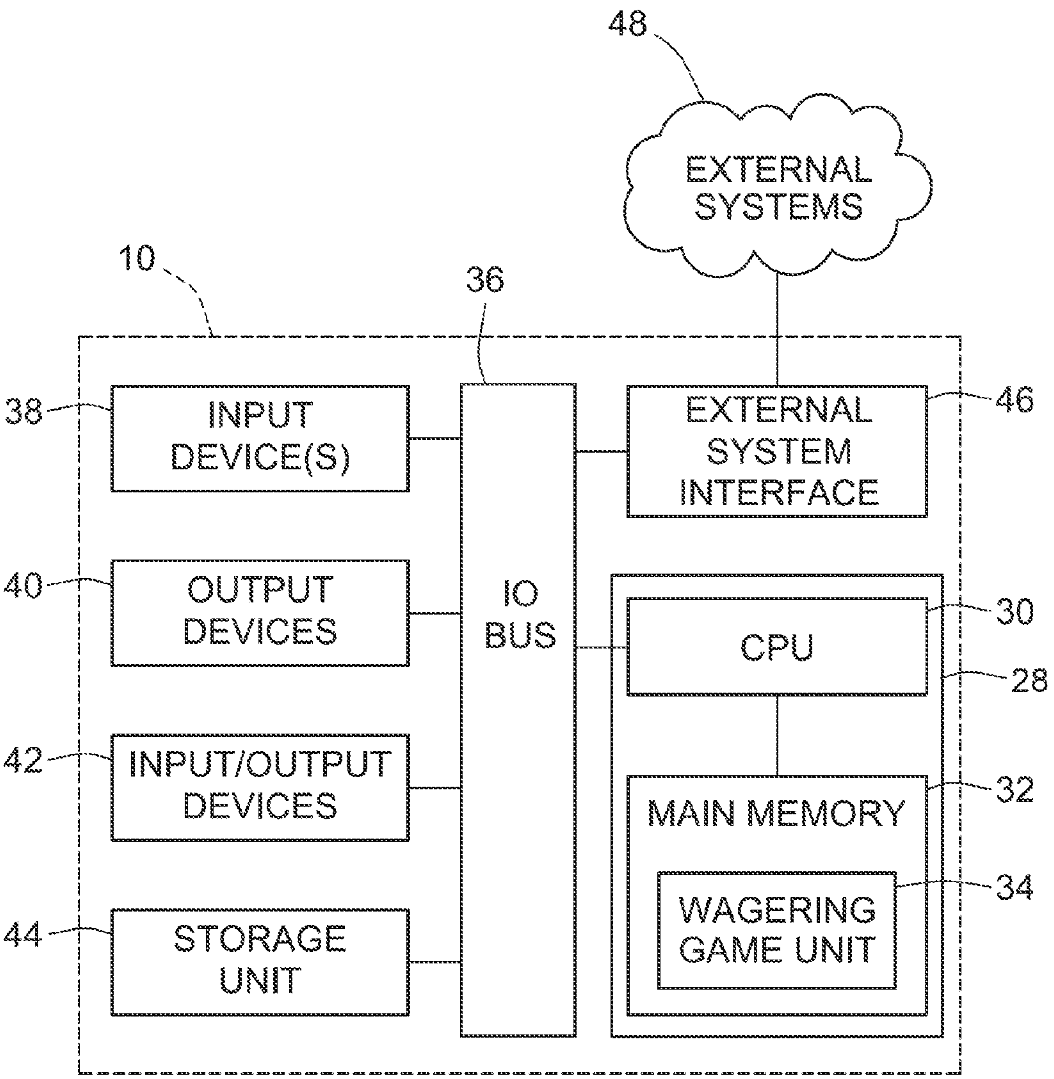
FIG. 1B (PRIOR ART)
FIG. 1B is a schematic view of a free-standing gaming machine and associated system according to an embodiment of the present invention.

Turning now to FIG. 1B, there is shown a block diagram of one gaming-machine architecture. The gaming machine 10 includes game-logic circuitry 28 having a central processing unit (CPU) 30 connected to a main memory 32. The CPU 30 may include any suitable processor(s), such as those made by Intel and AMD. By way of example, the CPU 30 may include a plurality of microprocessors including a master processor, a slave processor, and a secondary or parallel processor. Game-logic circuitry 28, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 28, and more specifically the CPU 30, comprises one or more controllers or processors and such one or more controllers or processors need not be disposed proximal to one another and may be located in different devices or in different locations. The game-logic circuitry 28, and more specifically the main memory 32, comprises one or more memory devices which need not be disposed proximal to one another and may be located in different devices or in different locations. The game-logic circuitry 28 is operable to execute all of the various gaming methods and other processes disclosed herein. The main memory 32 includes a wagering-game unit 34. In one embodiment, the wagering-game unit 34 may cause wagering games to be presented, such as video poker, video black jack, video slots, video lottery, etc., in whole or part.

The game-logic circuitry 28 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1A.

The I/O bus 36 is also connected to a storage unit 44 and an external-system interface 46, which may be connected to external system(s) 48 (e.g., wagering-game networks).

The external system 48 includes, in various aspects, a gaming network, other gaming machines or terminals, one or more gaming servers, a remote controller, communications hardware, or a variety of other interfaced systems or components, in any combination. In yet other aspects, the external system 48 may include a player's portable electronic device (e.g., cellular phone, electronic wallet, etc.) and the external-system interface 46 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 48 such that the gaming machine 10 operates as a thin, thick, or intermediate client. The game-logic circuitry 28—whether located within ("thick client"), external to ("thin client"), or distributed both within and external to ("intermediate client") the gaming machine 10—is utilized to provide a wagering game on the gaming machine 10. In general, the main memory 32 (comprising one or more memory devices) stores programming for a random number generator (RNG) service/server, game-outcome logic, and game assets (e.g., art, sound, etc.). When a wagering-game instance is executed, the CPU 30 (comprising one or more processors or controllers) executes the RNG programming to generate one or more pseudo-random numbers. The pseudo-random numbers are utilized by the CPU 30 when executing the game-outcome logic to determine a resultant outcome for that instance of the wagering game. The resultant outcome is then presented to a player of the gaming machine 10 by accessing the associated game assets, required for the resultant outcome, from the main memory 32. The CPU 30 causes the game assets to be presented to the player as outputs from the gaming machine 10 (e.g., audio and video presentations).

The gaming machine 10 may include additional peripheral devices or more than one of each component shown in FIG. 1B. Any component of the gaming-machine architecture may include hardware, firmware, or tangible machine-readable storage media including instructions for causing computing equipment to perform the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 1C:
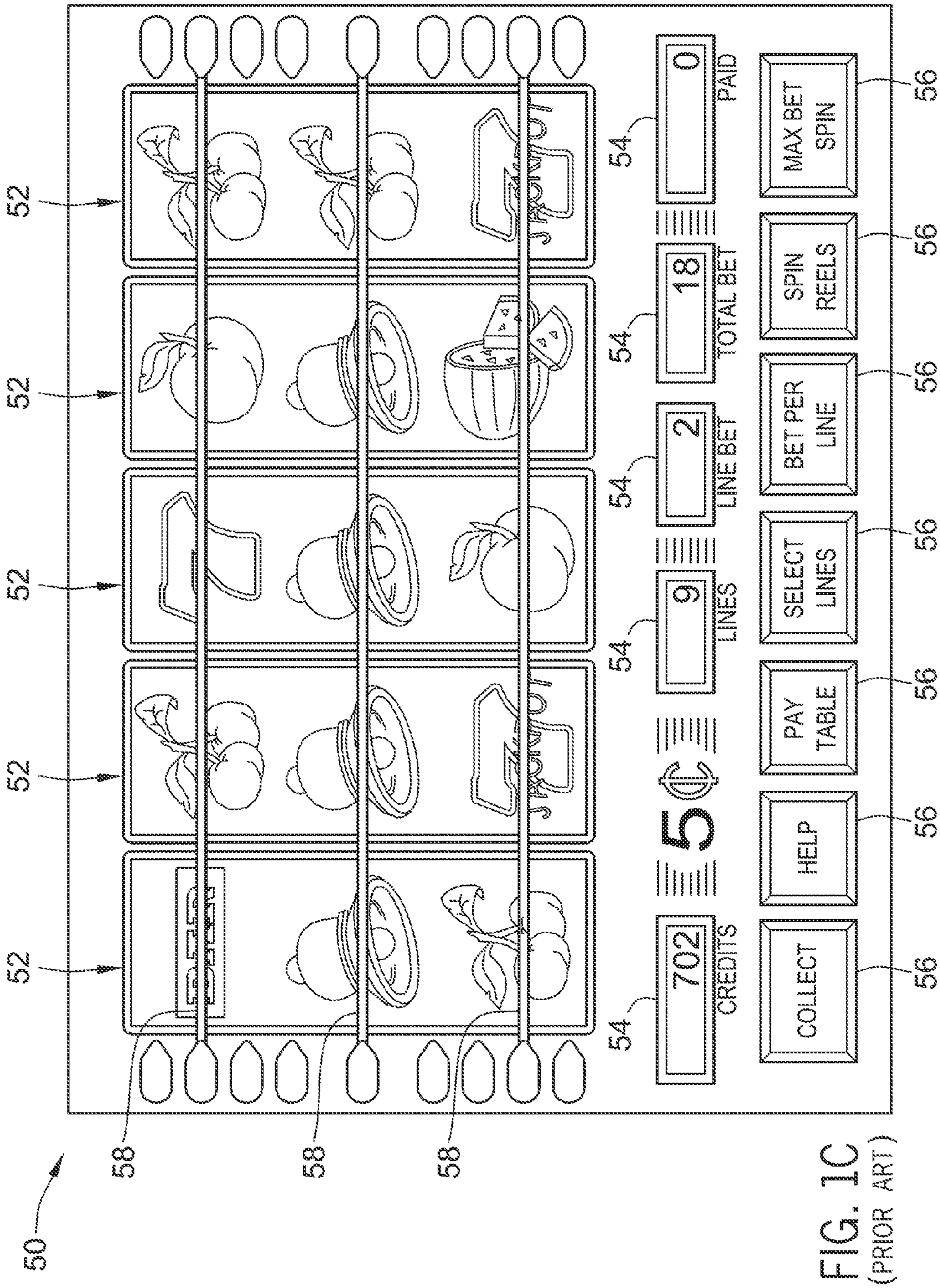
FIG. 1C (PRIOR ART)
FIG. 1C is an image of an exemplary basic-game screen of a wagering game displayed on a gaming machine, according to an embodiment of the present invention.

Referring now to FIG. 1C, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1A. The game-logic circuitry 28 operates to execute a wagering-game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1A, following receipt of an input from the player to initiate a wagering-game instance. The gaming machine 10 then communicates the wagering-game outcome to the player via one or more output devices (e.g., primary display 12 or secondary display 14) through the display of information such as, but not limited to, text, graphics, static images, moving images, etc., or any combination thereof. In accord with the method of conducting the wagering game, the game-logic circuitry 28 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 28 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 30 causes the recording of a digital representation of the wager in one or more storage media (e.g., storage unit 44), the CPU 30, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU 30 (e.g., the wager in the present example). As another example, the CPU 30 further, in accord with the execution of the stored instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG Service) that is used by the game-logic circuitry 28 to determine the outcome of the wagering-game instance. In at least some aspects, the game-logic circuitry is configured to determine an outcome of the wagering-game instance at least partially in response to the random parameter.

Figure 2:
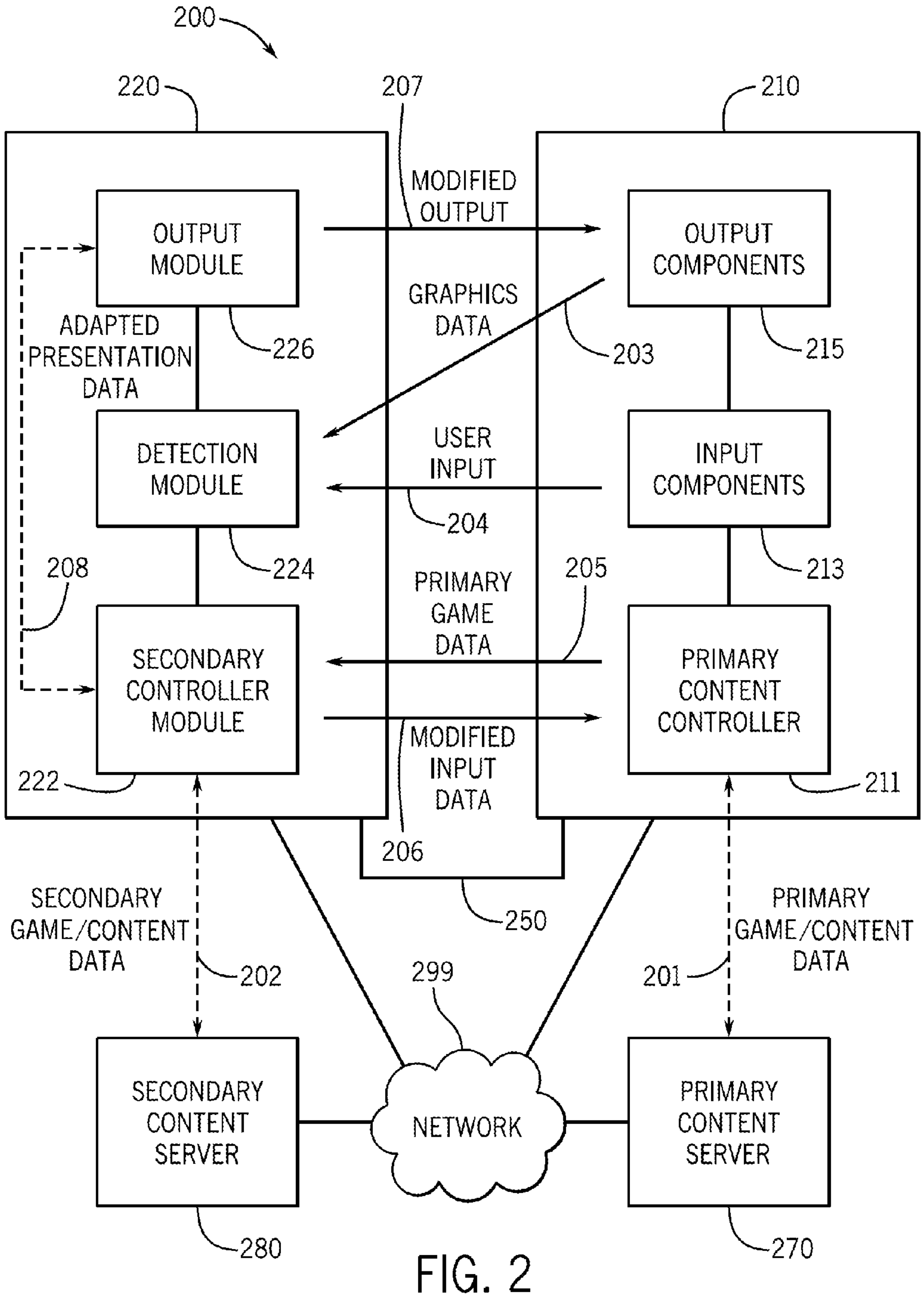
FIG. 2 is a schematic view of a gaming system according to one embodiment of the present invention.

Referring to FIG. 2, a conceptual diagram is shown according to one embodiment illustrating an example of a game system architecture 200. The game system architecture 200 includes a primary gaming machine 210, a secondary content controller 220, a primary content server 270, and a secondary content server 280, which all communicate using an internal bus 250 or via an external networking interface (not shown) via network 299.

The game system architecture 200 may provide wagering games and wagering gaming services, including wagering game content hosting and delivery, financial transactions and accounting management, and communications between terminals and network servers to enable distributed "progressive" jackpots, game transaction logging, distributed collaborated gaming, etc. Alternatively, the game system architecture 200 may provide no wagering functionality with its gaming, content, or services in any capacity. Any combination of wagering and non-wagering gaming, and associated content and services performed by the game system architecture 200 is possible. The specific type of game(s) provided by any local or remote data source, in addition to any further distributed services and network available information, content, or gaming methodologies, are all envisioned as being possible variants without departing from the spirit and scope of the invention.

Communication and information flow between system components using an internal bus 250 (which may include universal serial bus (USB), peripheral component interconnect (PCI), and/or peripheral component interconnect express (PCI-E)) is typically much faster than communication via the network 299. One reason for this may include the requirement for a network interface system (not shown). Another reason may involve the overhead inherent in the buffering and processing of data packets conforming to communication protocol(s) configured to facilitate wired or wireless communication and data transfer between various network terminals, both local and remote. In one embodiment, external systems may include portable electronic devices, electronic wallets, other gaming machines, network routers or gateways providing access to other networks including wagering game networks, external servers, etc.

The primary gaming machine 210 may be configured to present and control one or more games as well as other content associated with the games. As mentioned prior, these games may include wagering games, entertainment based games, or some combination of both. The primary gaming machine 210 includes a primary content controller 211, one or more input components 213, and one or more output components 215. The secondary content controller 220 includes a secondary controller module 222, a detection module 224, and an output module 226.

The primary content controller 211 is configured to control one or more content processes, such as a primary game, other additional game(s), and other content, provided by a primary source of content which may include game content. For example, the primary content server 270 can provide primary game and content data 201 to the primary content controller 211, such as control and application data for one or more thin-client applications controlled by the primary content controller 211. Alternatively, the primary source of content may be statically stored in memory local to the primary content controller 211 via a data bus. For example, memory may include one or more of machine-readable storage media includes read only memory (ROM), random access memory (RAM), magnetic-disk storage media, optical storage media, flash memory, etc.

The primary content controller 211 may include one or more processing units and one or more associated memory devices for performing the described various operations of the primary content controller 211. For example, the primary content controller 211 executes game applications in addition to many, if not all, of the services and operations of the primary gaming machine 210 and its components. This includes the operating system and any application programming interface (API) defined for the primary gaming machine 210 as a whole. Additional services may include a RNG service/server, printer services, card reader/writer input/output, bill validator, etc., all accessible via the API executing on the primary content controller 211.

The primary content controller 211 may also include one or more dedicated mechanical reel controllers (not shown) which receive high level commands from a primary central processing unit within the controller 211 and generate low level commands to control the reels via the API. Other types of the primary content controller 211 configurations and command/message exchange between various system components may be used for differing mechanical devices and components without departing from the spirit and scope of the invention.

The one or more input components 213 are configured to control and/or provide input for the games and other content presented via the primary gaming machine 210. For example, the input components 213 may include one or more touch-screen displays by which a user can touch a screen and select certain virtual controls, objects, items, etc., presented one or more of the touch-screen displays. In another example, the input components 213 include a button panel with buttons related to one or more games or other applications or services. The buttons, for example, may indicate betting amounts, payline amounts, spin controls, or other items used to make bets, spin reels, etc., for a wagering game. The buttons may also detect input related to payout mechanisms and/or cashing out a wagering game, such as an activation of a cash-out button used to transfer credits from wagering game credit balances to a cash-out object, card, account, etc. The buttons may also accept input related to casino services and amenities. In some examples, the input components 213 include cameras, audio input devices, or joysticks to gather user gestures, sounds, and/or physical interaction to generate corresponding input for a game. In yet other examples, the input components 213 include eye tracking equipment, biometric devices, and so forth. In some examples the input components 213 also includes input devices related to funds, player information, etc. For example, the primary gaming machine 210 includes an information reader that reads information from a card or device and connects to a player account, a customer loyalty account, a financial account, etc. In some examples, the information reader can communicate with a mobile device, such as a player's personal mobile device.

One or more output related components 215 are configured to control and/or present output information related to the games and the other content. For example, the primary gaming machine 210 includes one or more display devices that present wagering game content, content for casino services, content for advertisements, and so forth. The output components 215 further include one or more video and graphics devices or engines that generate an image of content to present via the one or more displays associated with the primary gaming machine 210. In another example, the output components 215 includes speakers, sound cards, etc., that generate and/or present signals and sounds for the games and other content. In another example, the output components 215 include one or more payout mechanisms, such as a printer that prints out tickets, coupons, etc. related to the games. For example, the printer can print out a ticket that shows a cash-out amount for one or more wagering games concurrently presented via the primary gaming machine 210. In yet another example, the primary gaming machine 210 includes various lighting devices that show information related to games, such as lighting effects (e.g., a celebratory effect, an attract effect, etc.).

The secondary controller module 222 enables the secondary content controller 220 to communicate with various components and operating system services of the primary gaming machine 210, typically via the API. This enables the secondary content controller 220 to present, receive, and control various aspects of independent secondary content using the output components 215 and the input components 213 of the primary gaming machine 210.

The secondary controller module 222 may include software and hardware, such as one or more processors, one or more memory devices, an operating system, game applications, etc., including memory modules comprising one or more of machine-readable storage media includes read only memory (ROM), random access memory (RAM), magnetic-disk storage media, optical storage media, flash memory, etc. The secondary controller 220 executes programmatic instructions which provide a graphical user interface which may be retrieved, defined, and generated in a variety of ways. In one embodiment, the secondary controller 220 requests remotely stored graphical user interface programmatic instructions (for example, from the primary content server 270 and/or the secondary content server 280) and may be retrieved on demand over an arbitrary network (for example, a local area or Internet network 299) using standardized industry protocols (e.g., file transfer protocol (FTP) or hypertext transfer protocol (HTTP)).

The detection module unit 224 is configured to detect information from the various devices and components of the primary gaming machine 210 including information from the input components 213 and the output components 215. For example, the detection module 224 receives the graphics data 203 from the output components 215 and forwards the graphics data to the secondary controller module 222 for further processing. In one embodiment, the detection module 224 detects the graphics data 203 (e.g., graphical and video presentation data) provided from a video card, a graphics engine, or other sources of graphics data generated by the primary gaming machine 210. The graphics data 203 may include a position of primary content on a display of the primary gaming machine 210 according to default display parameters (e.g., default size of a display area, default display dimensions, etc.).

The output module 226 provides modified output data 207 to the output components 215 of primary gaming machine 210. After the secondary controller module 222 receives the secondary game and content data 202 from the secondary content server 280, or alternatively, from local memory module(s) (not shown), adapted presentation data 208 is generated with information indicating where to position a secondary graphical user interface. This may include specifying any positioning and details regarding a secondary game or other secondary content placement relative to the position of the primary content in a unified graphical user interface. The output module 226 then incorporates information about the secondary content and the primary content in the modified output data 207 so that the display device of the primary gaming machine 210 can concurrently present both the primary and secondary content. This process may include manipulating the graphics data 203 to move or resize the position of the primary content relative to the display parameters of the desired presentation layout. The secondary controller module 222 then sends the adapted presentation data 208 to the output module 226, such as display coordinates, display boundaries, display sizes, or other display data for the primary content that has been moved or resized to accommodate the presentation of an independent secondary game. The output module 226 receives the adapted presentation data and provides the modified output data 207 to the output components 215 of the primary gaming machine 210. The output components 215 use the modified output data 207 to display the primary content and the secondary content on one or more display devices of primary gaming machine 210.

Further, in some embodiments, the detection module 224 intercepts the user input 204 from the input components 213 and provides the user input 204 to the secondary controller module 222. The secondary controller module 222 receives the user input 204, interprets the user input 204, and, in some cases, modifies the user input 204 according to the adapted presentation data 208, generating a modified input data 206. The secondary controller module 222 further provides the modified input data 206 to the primary content controller 211. For instance, the detection unit 224 intercepts a touch-screen input from the input components 213 before the primary content controller 211 can detect the touch-screen input. The detection unit 224 forwards the touch-screen input to the secondary controller module 222. The secondary controller module 222 converts or remaps the touch-screen input to different coordinates of the touch-screen display that relate to a modified location of primary content on the display as well as to secondary content presented on the display. The secondary controller module 222 sends the modified input data 206 to the primary content controller 211 so that the primary content controller 211 can control a primary game according to the modified input data 206. The secondary controller module 222 further detects the primary game data 205 generated by the primary content controller 211 so that the secondary controller module 222 can generate updates to the adapted presentation data 208.

The primary gaming machine 210 and the secondary content controller 220 may communicate in one or more various ways, independently or simultaneously, typically through calls and requests made via the API. Information may flow between the various components of primary gaming machine 210 and the secondary content controller 220 via a network 299 or an internal/external bus 250. The bus 250 may have additional resources, equipment, and/or memory modules connected therewith which provide or store information used by the primary gaming machine 210 and/or the secondary content controller 220, and may be implemented internally or externally to primary gaming machine 210. As mentioned above, memory modules may include any type of digital storage including one or more of machine-readable storage media like read only memory (ROM), random access memory (RAM), magnetic-disk storage media, optical storage media, flash memory, etc., and the use of one or more of these memory types should not be construed to depart from the spirit or scope of the invention.

As a general rule, most information which flows between the primary content controller 211 and the input/output components 215/213 passes through the secondary content controller 220. This enables video output from the primary content controller 211 to run unaltered in some or all of a portion of one or more displays of the primary gaming machine 210, for example in an arbitrarily defined window or frame. For this reason, no physical or programmed alteration of the content or primary game and content data 201 or other primary game content of the primary gaming machine 210 is required, even in combination with any secondary processes; the primary gaming machine 210 maintains all functionality and operation enabled by the primary game and content data 201, the primary content controller 211, and all specified original and additional gaming/non-gaming programmatic/display content.

In one embodiment, the secondary content controller 220 is configured to receive video input from the primary content controller 211 directed for output on the display device(s) 215 of the gaming machine. The video output generated by the primary content controller 211 is processed by the secondary controller module 222 and may be adjusted by compression and/or displacement to make room on the display(s) 215 for additional region(s) of the graphical user interface. Alternatively, a secondary graphical user interface may be superimposed over the native video output generated by primary content controller 211. Any ambiguity in touch input in overlapping interactive regions of game play shown on primary/secondary displays 215 and the in-use graphical user interface(s) is also specified. This reduces interference or confusion during the use of superimposed interfaces by determining proper handling of coordinate input information intended for game-logic circuitry (primary) graphical interface, secondary graphical user interface(s), or both. A secondary controller module may specifically include functional contingencies for input and output in overlapping regions in these instances, including selective routing of touch input to a particular gaming process by determination of which game interface resides at a higher logical layer based on the overlaid imagery.

In one embodiment, the secondary content controller 220 instantiates a secondary graphical user interface which envelops (i.e., encapsulates) a primary graphical user interface generated by the primary content controller 211 and translates coordinate input from the input components 213 into native coordinate information relative to the primary graphical user interface. In this case, it is noted that the primary graphical user interface operates as an independent subset/subcomponent of the secondary graphical user interface. As a result, the primary content controller 211 and the primary graphical user interface are unaware that a secondary content controller 220 exists, and any associated secondary graphical user interface is being used in conjunction with it. The primary content controller 211 continues to perform functions (of the primary game) while receiving coordinate input native to the primary graphical user interface. The received input coordinate data is interpreted as if no secondary content controller 220 and secondary graphical user interface is being implemented.

In another embodiment, the secondary content controller 220 instantiates a secondary graphical user interface which operates independently from a primary graphical user interface generated by the primary content controller 211 and the primary gaming machine 210, where the two graphical user interfaces do not overlap or interact. The overall process and operation as detailed is effectively unchanged in an embodiment where the secondary content controller 220 modifies and presents video information, translates user input data, and issues commands to the primary content controller 211 using the API, solely during secondary game operation/control.

In one embodiment, the secondary content controller 220 uses industry standard protocols and a second network URL to retrieve, load, and execute programmatic instructions for the graphical user interface and any secondary games and content from a remote server (e.g., secondary content server 280). In most instances, the secondary content server 280 is distinct from the primary content server 270, but various other configurations and services topologies remain within the scope and spirit of the invention. The second network URL provides programmatic code to establish and execute a secondary or unified graphical user interface which interfaces with the services available to the operating system of the primary machine 210 via the API as detailed above. In another embodiment, the secondary content controller 220 is populated with programmatic instructions at the command of the primary content server 270. This allows a properly authorized and authenticated (i.e., trusted) primary content server 270 to control the access and loading of content information and software to the secondary content controller 220 in a secure manner.

In one embodiment, the game system architecture 200 includes a primary gaming machine 210 which relies on remote network servers to store and deliver gaming content upon request. The primary content controller 211 uses a first network uniform resource locator (URL) to retrieve, load, and execute programmatic instructions for the primary game from a remote host (e.g., primary content server 270).

The spirit and scope of the present invention includes primary gaming machine 210 providing other types of content in addition to wagering/non-wagering games, including additional wagering games, non-wagering games, and/or multimedia content stored locally and/or remotely. These games and/or content may be accessed in the same way the current game(s) are accessed, for example, through use of transferring programmatic instructions and associate data over a network via remote content servers including primary content server 270 and secondary content server 280.

In some embodiments, the primary content server 270 and/or the secondary content server 280 may act as wagering game content servers, in that any content and gaming instructions contained therein are purely for wagering applications. Each of a primary content server 270, a secondary content server 280, or neither, may specifically comprise wagering or non-wagering games, in addition to any type of additional content and gaming methodologies which may specifically specify or otherwise be incorporated into a secondary or unified graphical user interface in accordance with the current invention. Thus, the primary game and/or content data 201 and the secondary game and/or content data 202 may comprise a wide variety of contextual information, in addition to particular programmatic instructions and formatting requirements which will ultimately forge presentation data for the display device(s) and overall operation of the primary gaming machine 210.

In response to the request for the primary game and content data 201, the primary content server 270 may also include a directive (i.e., a command, or additional software module) causing the primary content controller 211 to initiate specific tasks. This may include authorizing and/or configuring the primary content controller 211 to populate the secondary content controller 220 (or accessible memory modules) with content and/or programmatic instructions. Further, the primary game and content data 201 may include authorization or software which configures the primary content controller 211 to execute a specific application programming interface (API) listening process to enable a secondary content controller 220 to access various services of the primary gaming machine 210 controlled by the primary content controller 211. As detailed prior, these services may include random number generation (RNG) for outcome determinations, actuation of mechanical game components of the primary gaming machine 210, etc. This enables the secondary content controller 220 to interface directly with the various operating system services of the primary gaming machine 210 via the API listening process executing on the primary content controller 211. Further, the API listening process shields the primary content controller 211 from knowing where the issued commands originate from. In this way, the primary content controller 211 may remain completely unaware that the secondary content controller 220 is mediating all input and output of the primary gaming machine 210. The API listening process also may be configured to authenticate the secondary content controller 220 as a whole, or individual components of the secondary content controller 220. Authentication may include hash calculations, certificate access/transfer, or any other authentication method, as known in the art without departing from the spirit and scope of the invention.

This configuration of game system architecture 200 enables the secondary content controller 220 to interact and control aspects of a primary game (as defined by the primary game and content data 201) simultaneously or completely separate from any secondary games and content executed by secondary controller module 222. Further, the secondary content controller 220 may control mechanical components and have access to other operating system services of the primary gaming machine 210 via the API listening process. In some instances, the primary content controller 211 is not specifically aware that a secondary content controller 220 is present or connected, and simply responds to specific events with associated programmed instructions which transfer control or processing to a secondary content controller 220.

The secondary controller module 222 is also capable of using mechanical components of the primary gaming machine 210 solely for use by the secondary content controller 220 (e.g., a secondary wagering game). That is, the secondary content controller 220 can take sole ownership of various mechanical components of the primary gaming machine 210 and use them directly by requesting services of the primary content controller 211 via the API without requiring an accompanying primary game. Further, the secondary content controller 220 may prohibit the primary content controller 211 from using the mechanical components of the primary gaming machine 210 during secondary game execution. The secondary content controller 220 may also perform secondary games which rely on or manipulate results of mechanical processes of a primary game as performed by the primary content controller 211. The specifics of the interaction of the primary game(s) and the secondary game(s) of the primary gaming machine 210 are highly variable, and any combination therewith remains part of the intended spirit and scope of the invention.

The secondary game and content data 202 defining the secondary processes (e.g., secondary games and secondary content) may be remotely stored and retrieved from any part of game system architecture 200. In one embodiment, the secondary content controller 220 and secondary controller module 222 are configured with programmatic instructions from an authorized local or remote source, (e.g., the primary content server 270 and/or the secondary content server 280). Access to remote information may occur via a communicative coupling which may include a communications network internal to the primary gaming machine 210 or as part of the game system architecture 200 implementing various communication protocols, standard or proprietary, as is known in the art. The communicative coupling may include network communications between networked elements using standard protocols (e.g., TCP/IP) or opaque communication methods between network processes (e.g., network socket). The invention should not be limited by the location of information storage or the type of communicative coupling and messaging which is used to exchange information between components of the game system architecture 200.

Once the secondary controller module 222 is configured with a graphical user interface and the secondary games as dictated by secondary game and content data 202, the secondary controller module 222 communicates with the primary content controller 211 operating system services via the listening API process. This enables the secondary controller module 222 to interact with the primary gaming machine 210 by sending commands to the operating system services to perform various services and interact with the primary game (e.g., set the bet amount, initiate a primary game, etc.) as well as control the primary gaming machine 210 to activate mechanical reels/wheels/sliders and respond with information indicating the reel/wheel/slider stops so that the secondary controller module 222 can interpret and manipulate this data using the graphical user interface. This may include enhanced graphical content display aside from or overlaying the primary game graphical user interface. The secondary controller module 222 may also use the primary game information to determine outcomes of a secondary game solely confined to the secondary controller module 222. That is, the outcome of the secondary game executing on the secondary controller module 222 may be contingent on the outcome of the primary game executing on the primary content controller 211, or be relevant solely to the secondary game.

In response to requests from the secondary content controller 222, the operating system services executing on the primary content controller 211 may calculate results of the primary game and send the results back to the secondary controller module 222 for display on the graphical user interface as part of the transfer of winnings to the player. Alternatively, the secondary controller module 222 may further request transfer of winnings to the player account via the API by reporting winnings and secondary game results to the primary content controller 211 as if the primary game itself is providing the results. In this way, the secondary content controller 220 can control reels, reel stops, spin behavior, and the entire gaming operation on the primary gaming machine 210 using the communication API with native operating system services.

In yet another embodiment, a host (primary content server 270) may include as part of the primary game and content data 201 a command and associated URL for causing the primary content controller 211 to retrieve (using a standardized or proprietary protocol), load, and execute a secondary process including the secondary game and secondary graphical user interface. This secondary process executes independently from the operating system service of the primary gaming machine 210, and is independent from and unknown to all the operating system services of the primary gaming machine 210. The secondary game and content data 202 defining the secondary process may be remotely stored and retrieved from anywhere on the network, including from the primary content server 270 and/or the secondary content server 280. The separate, secondary process executing on the primary content controller 211, becomes logically equivalent to the secondary content controller 220, performing all functions previously outlined for the secondary controller module 222, the detection module 224, and the output module 226. The secondary process is configured to make connections to the operating system services layer of the primary content controller 211 (via the API), and may initiate the primary game(s) and/or the secondary game(s) by sending a command to the API to control mechanical components, respond with mechanical component stops, etc. The operating system services layer of the primary content controller 211 may then calculate the outcome of the game(s) and send results to the secondary process to transfer winnings to the player account for the secondary game. Additional various details of this embodiment may be gleaned from the prior discussions of the secondary content controller 220 without departing from the spirit and scope of the invention.

As mentioned prior, the graphical user interface initiated by the secondary content controller 220 may execute wagering and/or non-wagering applications, which may be completely independent from, or completely reliant upon, the results of a primary wagering and/or non-wagering game executing on the primary content controller 211. Typically, the secondary content controller 220 receives the graphical user interface and secondary gaming software from a remote or local host subsequent to request or command. It is also possible that the secondary content controller 220 is pre-configured with the graphical user interface software prior to initiation.

The secondary content controller 220 may provide games categorized as Class II (BINGO type, collectively played against other players rather than against the house), and/or Class III games (slot machines, blackjack, craps, roulette, and other games of chance). For example, this may include a BINGO-type game where the win is mapped to reel stops by a BINGO Game Live server (e.g., content server 270 or 280) and the primary gaming machine 210 simply acts as a display device, or the primary gaming machine 210 provides traditional video reels laid over the mechanical reels as part of the graphical user interface.

It is noted that each component shown in the game system architecture 200 is shown as a separate and distinct element connected via a communications network 299 and/or an internal bus 250. However, some functions performed by a particular component may be performed by one or more other components. For example, the primary content server 270 can also be configured to perform functions of the primary gaming machine 210, and other network elements and/or system devices. Furthermore, the components shown may all be contained in one physical or logical device, but some, or all, may be included in, or performed by, multiple devices, or other configurations not explicitly shown.

Furthermore, the game system architecture 200 can be implemented as software, hardware, any combination thereof, or other forms of embodiments not listed. For example, any of the network components (e.g., the game machines, servers, etc.) can include hardware and machine-readable storage media including instructions for performing the operations described herein. None of these implementation specifics impact the scope and spirit of the invention as described, and any specifics details of one or more of these embodiments or examples should not be considered limiting to the invention as a whole.

In another embodiment, the secondary content controller 220 is installed within the physical housing of primary gaming machine 210 (e.g., connected via bus 250) such that the primary gaming machine 210 contains all logically defined functional elements including the output module 226, the detection module 224, the secondary controller module 222, the output components 215, the input components 213, and the primary content controller 211.

Figure 3:
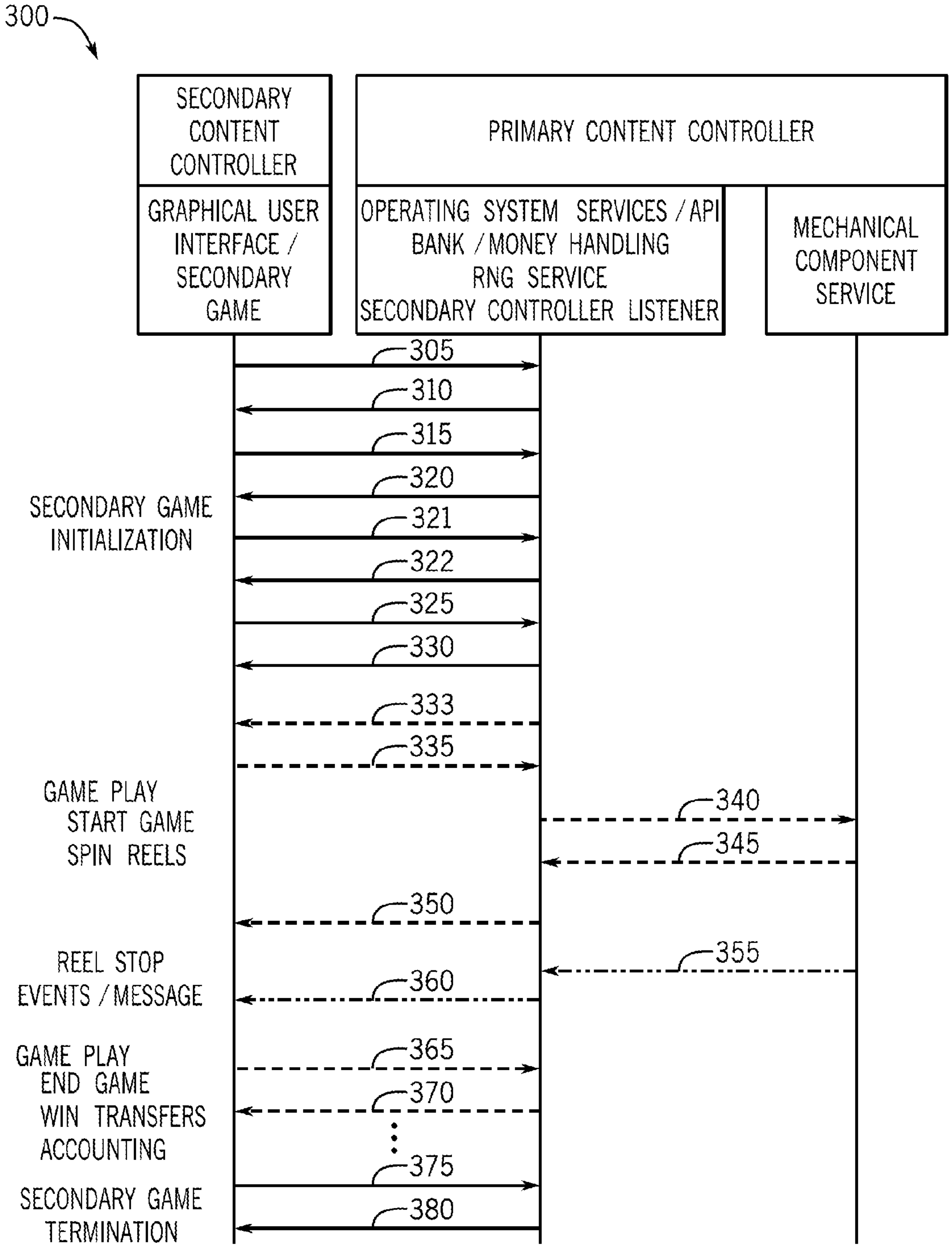
FIG. 3 is graphical representation of processes and information flow between a primary content controller and a secondary content controller in a gaming system according to one embodiment of the present invention.

FIG. 3 details one embodiment involving operation and interaction of the primary gaming machine 210 and the secondary controller 220, performing a secondary game actively using the mechanical components of the primary gaming machine 210. Process 300 details one process of secondary game play utilizing a secondary controller/process and graphical user interface for one embodiment of the invention as outlined above.

The primary gaming machine 210 is turned on and booted, which initiates the operating system services of the primary gaming machine 210. This may further include retrieval and transfer of functional code from one or more remote sources to be executed on a primary controller including the operating system itself, gaming and peripheral services, player credit bank and money handling, a secondary controller listening process, a primary game, a random number generator (RNG) service, a mechanical reel service, and any other required services on the primary content controller 211 as detailed prior.

The secondary controller listening process is an operating system service, typically authenticated and initiated by a trusted remote host. The secondary controller listening process receives commands issued from processes other than the primary game as defined in the primary game and content data. These commands are typically generated by the secondary content controller 220 and may result from user interaction with a secondary graphical user interface of a secondary game. The primary content controller 211 loads the secondary controller listening process as directed by the primary game and content data 201 and remote host(s). Any secondary graphical user interface is installed on a secondary content controller 220, or as a separate isolated process on a primary content controller 211. The primary content controller 211 configures the secondary content controller listening process to enable connectivity and communications between processes of the secondary content controller 220 and the primary content controller 211 in the primary gaming machine 210.

In step 305, the secondary content controller 220 sends a secondary controller start-up request to the primary content controller 211 via the API. The secondary controller start-up request is a command which requests a list of devices having operating system services and resources which will be granted to the secondary content controller 220 during gameplay. This may include mechanical reels which may spin, mechanical wheels which may rotate, mechanical or physical sliders which move, or mechanical or physical dice which may be deterministically manipulated.

In step 310, the primary content controller 211 responds with a list of available mechanical devices which may be accessed by the secondary content controller 220 via the API. Examples of these services may include mechanical reel control, wheel control, mechanical slider/dice control/manipulation, etc., which are accessible and controllable by the primary game machine 200 and primary content controller 211. The available services for these devices are dependent upon the API and a defined set of the devices for the particular primary gaming machine 210.

In step 315, the secondary content controller 220 requests a list of known events from the primary game 210 which may be used to trigger specific operations when these events occurs. Events may include user input actions (e.g., button actuation, graphical user interface interactions, sensor outputs, messages from other programs/threads, etc.). Events are processed by the primary content controller 221 at the API level and may include rerouting of communications and triggering further events. The operating system and API executing on the primary gaming machine 210 provides a set of functions performed by the primary gaming machine 210, often in response to the triggering of an event. That is, a set of events are defined which may trigger associated actions. Any event which involves a function of the primary game 210 must be directed to the primary content controller 211 for execution. In order for the secondary content controller 220 to utilize resources available to the primary content controller 211, the secondary content controller 220 must issue commands (or make requests) to the primary content controller 211.

In step 320, the primary content controller responds to the secondary content controller 220 with a list of events which are known to the primary content controller 211 which the secondary content controller 220 may be programmed recognize. These events typically comprise a set of events which are generated as a result of manipulation with the primary gaming machine 210, including button actuation, mechanical device state reporting, and/or various programmatic game states.

In response, the secondary content controller 220 determines which event(s) that are recognized by the primary content controller 211 it wishes to "subscribe" to. Subscribing to a list of events allows the secondary content controller 220 to be alerted to events which occur on the primary gaming machine 210 which are recognized by the primary content controller 211 and the operation system services executing thereon.

In step 321, the secondary content controller 220 subscribes to a specific set of events recognized by the primary content controller 211 via the API. Once this list of event subscriptions are provided, events which occur on the primary gaming machine 210 are delivered (i.e., routed) to and then processed by the secondary content controller 220 as each event occurs.

Depending on the way the primary gaming machine 210 and API are constructed, events which occur may cause messages to flow to both the primary content controller 211 and the secondary content controller 230 in one embodiment. In other embodiments, the API is designed to fully divert occurrence of the event to a stored network location or other memory or resource pointer. In some cases, the stored network location or resource pointer specifies an address related to a secondary content controller 220. Further, the primary content controller 211 may perform event notification by transmission of an event message to a specified memory or register location which causes an associated processor to react by performing a given action or software routine. In this way, it is possible to completely shield the presence of the secondary content controller 220 from the primary content controller 211. The primary content controller 211 responds to the triggered event with an event notification, but there is no knowledge or foresight by the primary content controller 211 regarding the processing or completion of process(es) associated with the event.

In step 322, the primary content controller 211 returns an event subscription list, specifying a list of events which will be routed to the secondary content controller 220 for processing, prior to any execution by the primary content controller 211. As just discussed, this may include a variety of differing embodiments which have varying levels of interaction of the primary content controller 211, including no interaction at all.

For example, when/if a specific action occurs on the primary gaming machine 210, or a specific state of the primary gaming machine 210 is reached, a specific event occurs which triggers a corresponding process to be initiated. When an event specified in the subscribed list of events occurs, the secondary content controller 220 may receive the event notification and respond accordingly. Sometimes, this further includes making further calls to functions defined in the API to control or use other components or services of the primary gaming machine 210.

Consider an event generated when a physical button of the primary gaming machine 210 is pressed to begin the secondary game. The "button press event" is recognized solely by the primary content controller 211. The primary content controller 211 checks the event subscription list to determine whether the event is intended for the secondary content controller 220 (i.e., if the event is on the subscription list). If so, the event is sent to the secondary content controller 230 for processing. If not, the event triggers corresponding functions to occur on the primary gaming machine 210.

In step 325, the secondary content controller 220 requests ownership and access to the mechanical device service(s) of the primary gaming machine 210. This may include calling a specific function of the API via the primary content controller 211. This may be required because the secondary content controller 220 is providing a graphical user interface, and a secondary wagering game is controlling and/or using information gleaned from the primary content controller 211 and mechanical component(s) of the primary gaming machine 210 to control and generate output. Further, exclusive access to the mechanical services of the primary gaming machine 210 may need to be established on behalf of the secondary content controller 220 to conduct various aspects of the secondary game(s).

In step 330, in response to the request for ownership, the primary content controller 211 assigns ownership of the specified mechanical device(s) to the secondary content controller 220 application(s) executing on the secondary controller module 222. This assignment enables the secondary content controller 220 to fully control the operation of the mechanical components of the primary gaming machine 210. In specific instances, for example mechanical reels, information mapping the mechanical reels, stops, symbols, etc., may be reported to the secondary controller module 222 as part of this response, or may be programmed as part of the secondary content controller 220 prior to ownership. Alternatively, this information may be remotely stored and transferred when the ownership message is received or processed, or at a later time.

Specified events which occur on the primary gaming machine 210 provided on the event subscription list are routed to the secondary content controller 220. Thus, events which occur on the primary gaming machine 210 may be recognized and processed solely by the secondary content controller 220. Further, commands which originate from the secondary controller module 222 may now be routed to selected mechanical device services executing on the primary content controller 211. Thus, the secondary content controller 220 may now initiate mechanical device actuation using the mechanical device services (using an appropriate call via the API) by sending a request to the primary content controller 211, and any API call to the mechanical device service sent to the primary content controller 211 from the secondary controller module 222 will now be accepted and performed by the mechanical components as if the request was initiated by the primary content controller 211.

In a different embodiment, the secondary content controller 220 may be directly connected to the input and output device(s) of the primary game machine, for example, by connection to an internal bus. This may further enable the secondary content controller 220 to "intercept" primary gaming machine 210 inputs or events and process them without primary content controller 211 even knowing an event has occurred. As above, the secondary content controller 220 may still initiate mechanical device actuation using the mechanical device services by sending a request directly to the primary content controller 211 using an appropriate call to the API, Once the secondary game is defined, the second content controller 220 is subscribed to a list of events, is fully connected to the primary gaming machine 210 via the API, and the proper resources for game play are secured, full interaction between the secondary game and the primary gaming machine 210 may occur. Player input for both the primary game(s) and the secondary game(s) may occur as a result of various player interactions with the primary gaming machine 210.

For example, when a secondary graphical interface executed by the secondary content controller 220 is used to start a secondary game, there is no required need for the secondary controller module 222 to translate input intended for the primary gaming machine 210 and primary content controller 211 to generate an event. The secondary controller module 222 may generate a corresponding event as a result of the interaction with the graphical user interface processed by secondary content controller 220. One such event is called a "Game Start Event", initiating the secondary game play.

Thus, when a virtual button on the graphical user interface is used to begin a secondary game, or when a physical button on the primary gaming machine 210 is used to trigger secondary game play, a "Game Start Event" is resultantly triggered. The "Game Start Event" event may cause the secondary content controller 220 to initiate, execute, and complete one or more selected secondary games. The secondary game(s) may additionally include actuating mechanical components (e.g., spinning reels) of the primary gaming machine 210.

As an example, the player initiates a secondary wagering game using the graphical user interface executed by the secondary content controller 220 by selecting a secondary wagering game from a list of secondary wagering games, setting a wager amount, and starting the secondary wagering game. Some secondary wagering games may use mechanics which implement the mechanical reels of the primary gaming machine 210 without requiring a primary (wagering) game to be executed. For example, the player may select a secondary wagering game which includes a BINGO-type game, having gaming cards comprising symbols thereon which correspond to one or more symbols on the mechanical reels. The player indicates a wager, and picks a corresponding BINGO card for game play.

In step 333, a "Button Press Event" is generated by player actuation of a physical button of the primary gaming machine 210 to begin the secondary game. If the "Button Press Event" is specified in the list of subscribed events, the "Button Press Event" is routed to and received by the secondary content controller 230 for processing, and a corresponding "Game Start Event" results.

If a wager is set, and a check is made as to whether there are sufficient funds in an account or on a credit meter to cover the wager, the funds are considered verified. Once funds are verified, the secondary content controller 220 generates the "Game Start Event" to inform the Accounting Host managing the player funds of deduction, and the secondary game is initiated. The "Game Start Event" is consumed by the secondary game process and results in continued operation of process 300. Once the secondary game begins, any wager amount committed is deducted from a credit meter associated with the secondary game. In the event of an error, for example insufficient funds, the secondary content controller 220 is typically programmed to respond to each particular condition with a different corresponding process to prohibit functions from taking place, or initiating corresponding contingency functions.

In step 335, after the "Game Start Event" is properly authenticated and consumed, the secondary game processor 220 begins a secondary game cycle by notifying the primary content controller 211 that the secondary game has begun. This initiates the secondary game gameplay which may include a series of processes, potentially including video generation and other types of initialization, presentation specifics, and the future sending of commands to the primary content controller 211 (via the API) to actuate appropriate (additional) mechanical components of the primary gaming machine 210 in due course.

In response, the operating system services executing on the primary content controller 211 requests random numbers from a Random Number Generator (RNG) server process, which may be executing either local to primary gaming machine 210, or remotely by a gaming server (e.g., server 270). The requested random numbers determine a resultant outcome for the secondary game by correlating mechanical component stop values to physical mechanical component positions. The mechanical component stop positions indicate which symbols which will be displayed by the mechanical components when they stop moving. That is, an established Operating System (OS) Services Layer requests the random numbers from the RNG Server and maps them to device specific stops (e.g., reel stops) for the mechanical components (i.e., reels) of the primary gaming machine 210. The OS Service Layer is established as part of the communication API of primary gaming machine 210, enabling exchange of information and events with other operating system services natively running on the primary gaming machine 210.

In step 340, the OS System Layer service on primary content controller 211 sends the mechanical component stops via the OS Service Layer to the Mechanical Component Service as part of an asynchronous command message. The asynchronous command message initiates rotation of the mechanical components and provides the position(s) at which the mechanical components will stop moving. That is, the mechanical component stop values indicate a particular position where each of the mechanical components will stop and are used by the Mechanical Component Service to stop movement of each component at a given position, for example to bear a given symbol to a viewer of the primary gaming machine 210. The nature of the asynchronous command message is such that the mechanical components perform the desired tasks (e.g., initiation of rotation, and reel stopping) in sequence, and messages are sent by the Mechanical Component Service as each task is completed.

In step 345, the Mechanical Component Service activates the component controller(s), actuates the mechanical components, and acknowledges the received command by sending a message back to the primary content controller 211 indicating the mechanical components will be actuated.

In step 350, once the mechanical component(s) of primary gaming machine 210 are confirmed to be actuated, it is confirmed to the player that the secondary game is started. This occurs in the form of a response message sent from primary content controller 211 to the secondary content controller 220 in response to step 335. The secondary content controller 220 may use this current game state to show video reels running (or a BINGO card) in the secondary graphical user interface. Alternatively, a secondary wagering game may provide animation or graphical supplemental support to the physical actuation of the mechanical components. For example, this may include projecting overlay imagery to the transmissive reels, or providing animation indicating a game with rotating components is underway.

In step 355, a mechanical component "stop event" is sent from the Mechanical Component Service to the primary content controller 211 indicating that the primary gaming machine 210 has stopped the mechanical component(s) of the primary gaming machine 210. This is an indication/confirmation that the mechanical components of the primary gaming machine 210 have stopped moving.

In step 360, another response to step 335 (i.e., a component stop event) is transmitted from the primary content controller 211 to the secondary content controller 220, along with any additional information or messages relating to the component stop event, indicating that the mechanical components of the primary gaming machine 210 have stopped, in addition to mechanical stops which indicate where the mechanical component(s) stopped moving. That is, the primary content controller 211 sends the mechanical stop values to the secondary controller module 220 to report the determined secondary game outcome (e.g., the reel stop values) to the secondary content controller 220. This enables the secondary game to provide further animation or graphical supplemental support associated with the stopping of the mechanical components.

The secondary content controller 220 may process the stop values to determine an outcome of the game, for example, based on a Game Outcome Pay Table for Class 3 Games. Other types of processes may be used, for example with stored numbers and a pay table for Class 2 Bingo or Pull tab games. For example, a win may be mapped to mechanical reel stops for a BINGO card using a remote Bingo Game Live server, while the primary gaming machine 210 acts as a display device for the BINGO game. A display of a resultant outcome for the secondary game is typical. For example, highlighting the win lines and indicting payouts for each payline. This enables the secondary content controller 220 to complete the visual part of the secondary game.

In step 365, the secondary content controller 220 provides accounting information to the primary content controller 211, for example, by transferring details of the win back to the primary game credit meter. That is, the secondary content controller 220 transmits details of the outcome of the secondary game back to the primary content controller 211. Information sent to primary content controller 211 may include accounting information and reflection of winnings accounted to a player credit meter utilized by the primary game. Further, the amount of any cumulative win or meter values may be reported to a remote accounting host, banking services, and/or the game history may be written to non-volatile random access memory (NVRAM). Alternatively, the primary content controller 211 may take received information and complete the cycle of the primary game by writing the game history to a specified NVRAM segment and/or operating system services communicating with appropriate accounting host(s) reporting meter values and events which occurred during game play in accordance with various regulations.

In step 370, the primary content controller 211 sends a message indicating that the game cycle has terminated. That is, role of the primary gaming machine 210 is complete in regard to the primary and secondary games. This response occurs as a result of the initial game start request made in step 335.

When the secondary game is initiated by button press or graphical user interface, steps 335 through step 370 are repeated until an event is triggered indicating the secondary game terminates. One such example includes the player "cashing out" and terminating game play. Other examples include use of the graphical user interface to transition solely to the primary game, another secondary game, or a new combination of primary and secondary games. When secondary game termination occurs, the following secondary game termination and ownership release steps take place.

In step 375, the secondary content controller 220 sends a request message to the primary content controller 211 via the API to release ownership of the mechanical components for which ownership was previously assigned in step 330.

In step 380, a response from the primary content controller 211 is sent to the secondary content controller 220 reporting that ownership of the mechanical devices of the primary gaming machine 210 are released. Commands from the secondary content controller 220 to the primary content controller 211 via the API will no longer control the physical components of the primary gaming machine 210. In order for the secondary controller module 220 to regain ownership of the mechanical devices and be able to send commands to actuate and manipulate them, the primary content controller 211 must perform an ownership assignment to the secondary controller module 220 as previously detailed.

In one embodiment, any primary games performed by the primary content controller 211 are not permitted to actuate or assume ownership of the mechanical reels until the mechanical reel service releases or resets ownership of the mechanical reels. Release or reset of ownership of the mechanical reels typically occurs via an API call made by, or on behalf of, the primary content controller 211. This may be automatically performed, for instance, when the secondary game(s) terminate, and will be detailed below.

If a new secondary game or combination of primary game and secondary game are selected, the process 300 begins again at step 305 as the secondary content controller 230 and the primary gaming machine 210 initialize the devices and events subscriptions to enable execution of the new selection(s) by the secondary game.

In differing embodiments, the types of messages, commands, controllers, and communication exchanges between the primary content controller 211, the secondary content controller 220, and the Mechanical Component Service, including ordering and format, may be totally different than this example while not departing from the spirit and scope of the invention.

Figure 4A:
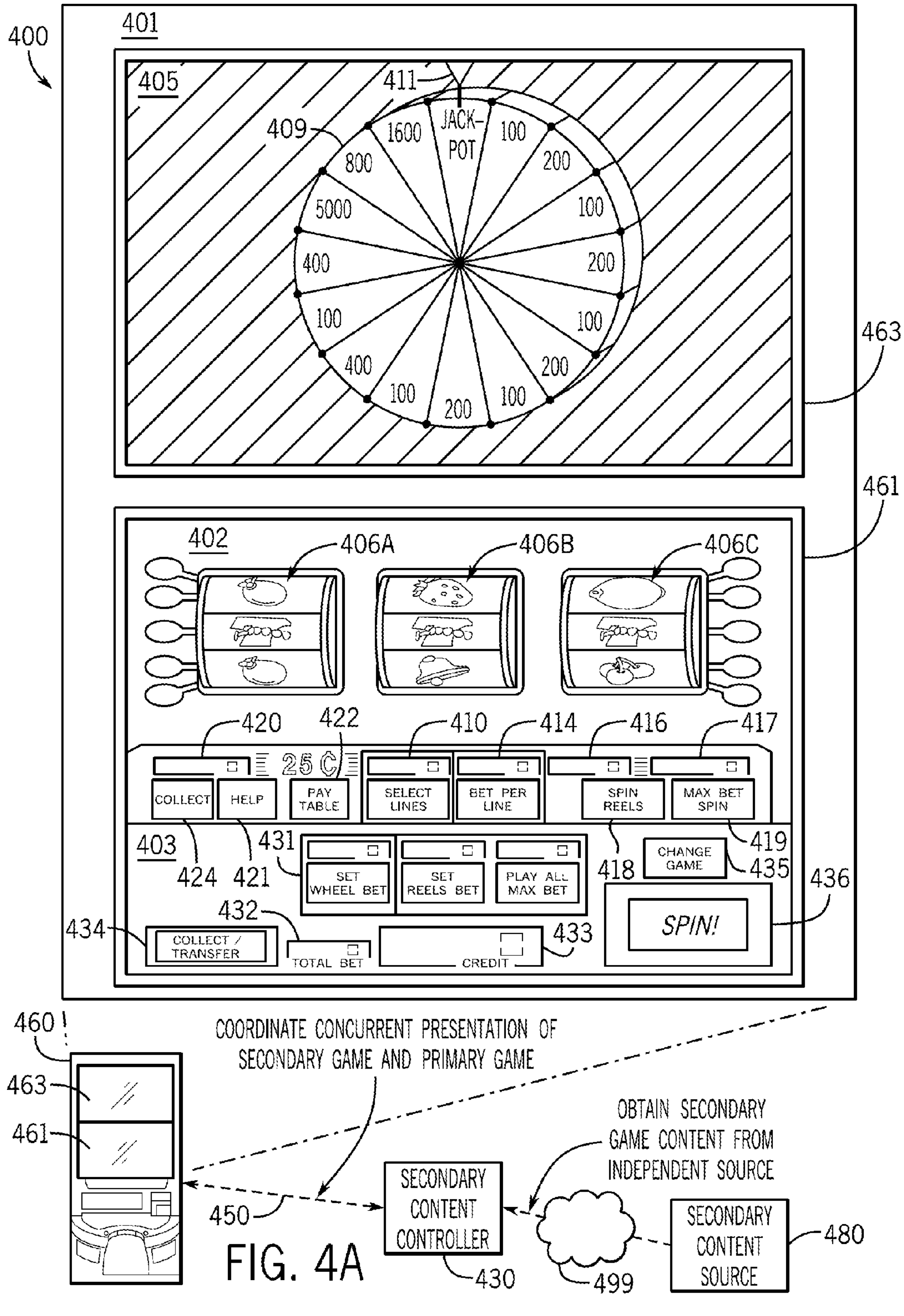
FIG. 4A is an image of an exemplary wagering game system having an enhanced view of display output according to one embodiment of the present invention.

Referring now to FIG. 4A, a wagering game system 400 includes a wagering game machine 460 connected to a secondary content controller 430 by a bus 450 which may include an internal computing bus and/or an external communication channel connecting to a wide area network. The wagering game system 400 also includes a secondary content source 480. The secondary content controller 430 is connected to the secondary content source 480 via a communications network 499 which may include an internal computing bus or an external communication channel connecting to a wide area network.

The wagering game machine 400 also includes a lower display 461 and an upper display 463. The wagering game machine 400 is shown comprising a graphical user interface 401 comprising a primary wagering game 402, a secondary wagering game 403, and an upper display section 405.

A number of virtual buttons are defined for primary wagering game 402, including a payline control button and meter 410, a bet-per-payline control button and meter 414, the total wager amount meter 416, a win/paid meter 417, a spin control button 418 to spin reels 406A-406C for the primary wagering game 402, a maximum bet spin button 419, a player credit meter 420, a help button 421, a pay table button 422, and a collect/cash out button 424.

The upper display 463 may include one or more video presentation spaces in the upper display section 405 which may show a variety of video, imagery, or decorative features, dictated by the primary wagering game 402 and/or the secondary wagering game 403. In various embodiments, the upper display 463 is an expansion of a presentation area of the graphical user interface 401, the primary wagering game 402, and/or the secondary wagering game 403.

In one embodiment, the wheel 409 is presented in conjunction with the upper display 463, and may be utilized for various gaming functions, including but not limited to a "bonus game", initiated by a given trigger or game state. Inclusion of the wheel 409 in the gaming may be initiated by results and/or events in either the primary wagering game 402 and/or the secondary wagering game 403. In one embodiment, actuation (i.e., rotation and stopping) of the wheel 409 may occur as a result of a winning combination on the reels 406A-406C, or may be another type of permanent or transient integrated gaming feature. In the present embodiment, instead of a video presentation, the wheel 409 is a physical, rotating, mechanically manipulated wheel, actuated and controlled principally by the primary wagering game 402. This control is in similar fashion to control of the reels 406A-406C, in that the wheel 409 stops at a particular section of the wheel as indicated by a physical pointer 411 indicating a stopping section, similar to the reels 406A-406C stopping at designated "stops" which bear symbols. Alternatively, a differing type of pointer 411 may be used, including generated video, which indicates which section is designated when wheel 409 stops rotating. Designated stops for the wheel 409 may be programmed such that the primary wagering game 402 and the secondary wagering game 403 are able to determine where the pointer 411 points in reference to the symbols/regions of the wheel 409, and may further control augmented or enhanced video and imagery for display on the graphical user interface 401, the primary wagering game 402, and/or the secondary wagering game 403, corresponding to the determined position of the wheel 409 and the wagering game being relied upon for input.

In one embodiment, the graphical user interface 401 including the primary wagering game 402 and the secondary wagering game 403 are generated on a lower display 461 which is a transmissive video display disposed in front of the plurality of symbol bearing mechanical reels 406A-406C. Further, the display 463 may also be a transmissive video display disposed in front of the wheel 409. The use of transmissive displays allow the mechanical devices in this embodiment to be visually altered by overlaid imagery and video controlled by the graphical user interface 401, the primary wagering game 402, and/or the secondary wagering game 403.

In one embodiment, the secondary content controller 430 fully coordinates the concurrent presentation of the primary wagering game 402 and the secondary wagering game 403 in a "unified" graphical user interface 401. The design and layout of the graphical user interface 401 comprising the primary wagering game 402 graphical user interface, the secondary wagering game 403 graphical user interface, and any additional secondary content added by the secondary content controller 430, is arbitrary and not limited to the current embodiment. Any variation in the layout and design of the sub components of a unified, concurrently displaying graphical user interface, such as graphical user interface 401, may be reasonably employed without departing from the overall scope and spirit of the invention.

The graphical user interface 401 may be used to control various gaming interface features of the primary wagering game 402 and/or the secondary wagering game 403. This may include additional video dice or video wheel(s), using various input methods including touch screen buttons or interactive gestures to control or impact gameplay, or initiate wagering on one or more of the wagering games. Alternatively, the graphical user interface 401 may be used to interact with or control various other gaming machine elements, including cameras, audio input devices, or joysticks to convert player user input into specific game play input, like indicating wager amounts, and initiating the wager causing the game to play and reel(s) and/or wheel(s) to spin.

In this embodiment, the graphical user interface 401 includes one or more bet control buttons and meters 431 for the secondary wagering game(s) 403, a total bet meter 432, a secondary wagering game credit meter 433, a cash out/collect/transfer credits to primary game button 434, a change game control button 435, and a mechanical actuation spin control button 436. In one embodiment, the change game control button 435 may be used to selectively control interaction between the primary wagering game 402 and the secondary wagering game 403. This may include determining or specifying whether the graphical user interface presented to the player is interacting with the primary wagering game 402 and the secondary wagering game 403 simultaneously, or a selection of a new secondary wagering game 403 is desired by the player. The mechanical actuation spin control button 436 may also act to initiate the secondary game by generating a "Game Start Event" provided all other criterion for secondary game activation are met, as detailed prior.

The secondary content controller 430 may also detect input via the display 461 for one or more aspects of the primary wagering game 402 or the secondary wagering game 403. This occurs when a player touches one or more of the first set of virtual buttons relating to the primary wagering game 402 (410, 414, 418, 419, 421, 422, 424, etc.), or one or more of a second set of virtual buttons to actuate features of the primary wagering game 402 and/or the secondary wagering game 403 (e.g., a bet control button and meter for secondary game(s) 431, a cash out/transfer credits to primary game button 434, a change game control button 435, and/or a start game control button 436). If the input relates to the primary wagering game 402, the secondary content controller 430 sends the touch input that corresponds to the primary wagering game 402 to the primary content controller so that the primary content controller can control the primary game according to the touch input. If the input relates to the secondary wagering game 403, the secondary content controller 430 uses the corresponding touch input to control the secondary wagering game 403.

Many of these button presses will result in "events" which may or may not correspond to events defined in the list of events which are provided to the secondary content controller 430 in the same way steps 315 and 320 operate for secondary content controller 220 in regard to FIG. 2-3. Once a list of events which may be recognized and routed to the secondary content controller 430 is obtained, the routing of input and actuation of physical components of wagering machine 460 becomes much simpler.

In many embodiments, the secondary content controller 430 is configured to intercept the player inputs made on a touch-screen of the display 461 in order to properly translate and determine coordinates for the input according to the specific implementation of the graphical user interface retied upon for the input. Depending on where the player touches input device's)/e.g. inputs made on the display 461), the secondary content controller 430 determines whether touch inputs relate to the (primary wagering game 402 or the secondary wagering game 403. This may involve various methods, including the provision of mapped or specified events detailed prior, or regions of the graphical user interface which initiate specific events.

The secondary content controller 430 may use the touch input as controls for either the primary wagering game 402 or the secondary wagering game 403 by translating the coordinates of the selected region of the graphical interface to another set of coordinates usable/recognized by the primary wagering game 402 or the secondary wagering game 403. In other words, the secondary content controller 430 can intercept the touch input received from the display 461 for the first virtual buttons and correlate the input to positions of the first virtual buttons on the display 461 to coordinates native to the primary wagering game 402. The secondary content controller 430 can also detect input via the display 461 for one or more aspects of the secondary wagering game 403, such as when a player touches one or more second virtual buttons (the bet control button/meter 431 and spin controls 436 to activate the appropriate physical or virtual device for both the primary wagering game 402 and the secondary wagering game 403). The secondary content controller 430 sends the touch input that corresponds to the primary wagering game 402 to the primary content controller so that the primary content controller can control the (primary wagering game 402 according to the touch input, and any touch input corresponding to the secondary wagering game 403 is routed to control the secondary wagering game 403.

In some instances, the primary wagering game 402 is suspended in lieu of a secondary wagering game 403 which takes control of the primary game machine 460 and its mechanical components for completing game play. In these embodiments, the secondary controller coordinates the presentations of the secondary wagering game 403 and primary wagering game 402 by removing the primary wagering game 402 and its associated graphical user interface from the "unified" graphical user interface. The secondary controller is in control of all input and output of the presented graphical user interface in these embodiments, and may arrange and configure all components of the secondary wagering game 403 accordingly.

Figure 4B:
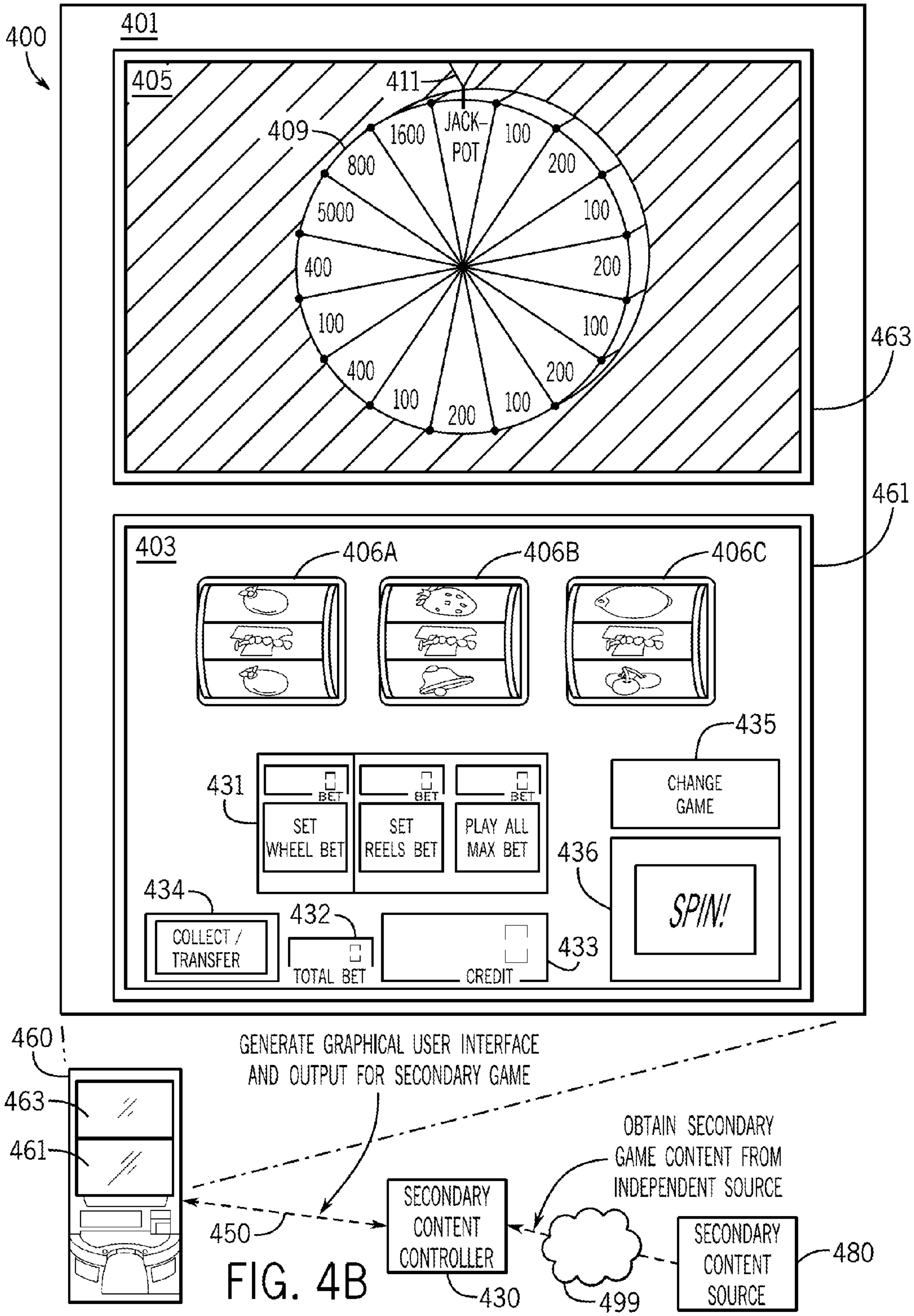
FIG. 4B is an image of an exemplary wagering game system having an enhanced view of display output according to another embodiment of the present invention.

One example of this primary game replacement/removal is shown in FIG. 4B. As described above, ownership of any mechanical devices must be assigned prior to the actuation of any mechanical component of the wagering game machine 460.

There are a number of instances where a secondary wagering game 403 uses and controls physical and mechanical components of a wagering gaming machine 460. These may include reel-based slot machine games which use differing symbols than the symbols presented on the mechanical reels 406A-C of a wagering gaming machine 460, a modified or rudimentary (or fully compatible) roulette game using a wheel on wagering gaming machine 460, and a BINGO-type game where winning BINGO cards or "balls" are mapped to mechanical reel stops of the wagering gaming machine 460. Other games may involve other mechanical actuated components, for example mechanical dice, a flipping coin, etc. The invention is not to be limited by the number or type of mechanical components which are relied upon for secondary wagering game 403 completion by utilizing various physical/mechanical components of a wagering gaming machine 460.

In other embodiments, any/all of the virtual buttons described above may be modified or absent from the implemented graphical user interface 401, and any triggered events generated by actuation of one or more buttons may be completely discretionary. The flexibility of the presentation and effect of manipulation of virtual buttons presented by the graphical user interface 401 is intentional, and is not intended to be limiting as long as it does not depart from the spirit and scope of the invention as a whole, including enabling a graphical user interface to actuate physical gaming elements of one or more wagering games and one or more gaming machines.

Figure 5:
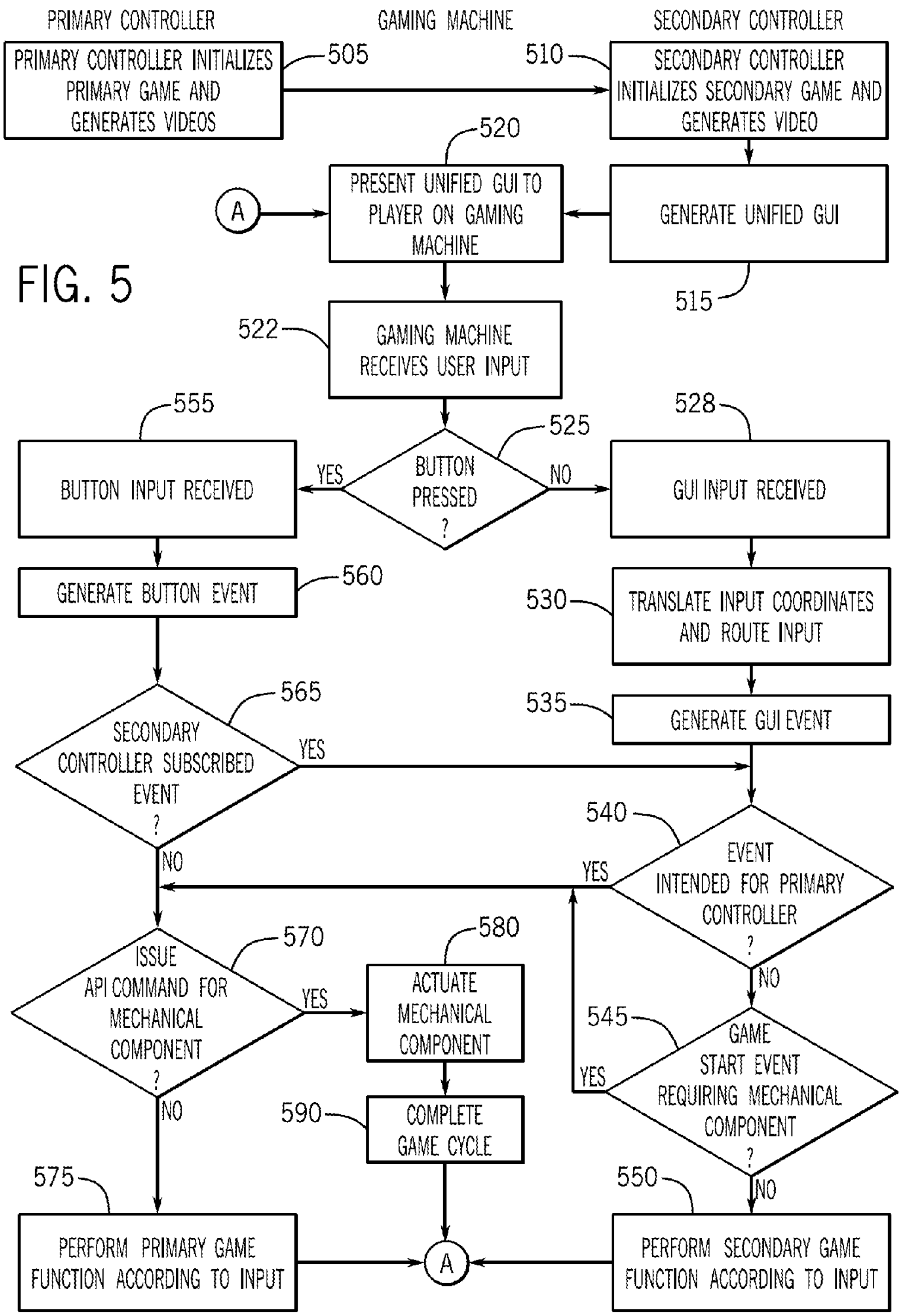
FIG. 5 is a flowchart illustrating a gaming system configured for conducting at least one game showing a secondary controller controlling mechanical components of the gaming machine according to one embodiment of the present invention.

FIG. 5 illustrates a flowchart of a process of the invention in accordance with one embodiment. Process 500 describes a high level processing flow chart describing the functions of a primary controller and a secondary controller during a machine gaming cycle, wherein secondary game execution optionally requires mechanical components controlled by the primary controller.

In step 505, the primary controller is initialized to execute primary game logic instructions by one or more central processing units to control various hardware components and generate primary game play. This includes the initialization of the operating system, primary game programmatic instructions, components, API functions, etc., and generation of associated video and audio output for the primary game.

In step 510, a secondary controller is initialized to begin secondary game logic instructions by one or more central processing units to control various hardware components to generate secondary game play. Initialization of the secondary controller may occur simultaneously and independently (e.g., in parallel) to the initialization of the primary controller and the primary game. The secondary controller generates the secondary game(s) and obtains ownership of mechanical components required for each of the secondary games, if appropriate, as detailed prior. The secondary controller also generates video (and/or audio) output for the secondary games.

In step 515, the secondary controller defines and constructs the entirety of the graphical user interface which includes the primary game, the secondary games, and any additional content (e.g., menu options, multimedia, etc.) as dictated by the game developer and the overall game design. That is, the secondary controller defines the specifics of a graphical user interface used to define interaction with the primary game play and with secondary game play according to a defined layout. The secondary controller merges the video (and/or audio) output of the primary game from the primary controller and the video (and/or audio) data of the secondary games of the secondary controller and creates a unified graphical user interface configured for operationally controlling both primary and secondary games, in addition to displaying other specified content.

The process of the secondary controller includes (bidirectional) mapping (i.e., translating) of coordinate information used in the unified graphical user interface into coordinate information separately usable by the primary game and/or the secondary games. In some embodiments, the primary game is confined to a particular section of the video output, and translation, compression, displacement, rotation, and/or other manipulative processing may occur to the primary game video prior to the display of video to the player. The secondary controller determines the layout of the primary game, the secondary games, additional content, and the overall structure of the unified graphical user interface, and maps the coordinate system of both primary and secondary game interfaces to the unified graphical user interface such that a coordinate system translation between the unified graphical user interface and the native graphical user interface of each game is achieved.

In one embodiment, the secondary controller may compress and displace the primary game video output to make room for a secondary game and/or a secondary graphical user interface in addition to the primary graphical user interface used for the primary game. In another embodiment, the secondary graphical user interface imagery may be superimposed onto the display of primary game components and the primary graphical user interface. In both cases, the unified graphical user interface as defined will seamlessly provide interaction with both the primary game and the secondary games by providing input and output coordinate translation and mapping.

Resultantly, the secondary controller is configured to determine a "native" set of coordinates which may be forwarded to the primary game and/or the secondary game depending on various determinations of applicability, and corresponding commands are issued to control various aspects of both a primary game and a secondary game, accordingly. These commands include the issuance of commands to a primary controller for mechanical actuation of physical components of the gaming machine related to a primary game executed on the primary controller.

In one embodiment, the primary controller and primary game have no knowledge of any details relating to the secondary game, secondary controller, or unified graphical user interface in use; the primary game simply operates as originally intended and directed, without perception of any secondary processes. That is, the presence of a secondary controller and any secondary game(s) may be indeterminable and undetectable by the primary controller and primary game.

In step 520, the unified graphical user interface is rendered to the player on the output device(s) of the gaming machine. The resulting output of the unified graphical user interface may include very comprehensive animation, highly detailed art rendering, high definition video segments, etc., which incorporates both the content and graphical user interfaces of the primary game from the primary controller and the secondary games from the secondary controller. Also, the input device(s) of the gaming machine now permits the player to utilize the unified graphical user interface to interact with and select secondary game(s), initiate primary and/or secondary game(s), etc., via the secondary controller. This occurs as a result of providing triggered events routed to and recognized by the secondary controller according to defined/assigned event subscriptions detailed prior.

In step 522, the gaming machine receives user input. As mentioned prior, user input may include a variety of differing input methods, including activation of one or more areas of a touch screen device (i.e., via the unified graphical user interface), or activation of a physical button of the gaming machine. Alternatively, user input may be achieved by other types of input devices which may be logically assigned to one of two input types: physical button input of the gaming machine or graphical user interface input. Regardless of the type, the user input may have various effects, including changing primary and/or secondary games, changing wager levels, lines in play, etc. The user input may also initiate game play, either a primary game, a secondary game, or both. The events defined as a result of these various player actions all correlate to specific function(s) performed by the gaming machine via the primary controller and/or the secondary controller.

In step 525, a determination is made as to whether the user input is a physical button of the gaming machine. User input is categorized into two distinct types, physical button input and logical button input. Logical button input typically occurs via graphical user interface (i.e., "soft" buttons), but may also be emulated through use of event generation by one or more other machine components. To ease complication, any received user input which is not a physical button (either of the gaming machine or an extension of the gaming machine like a joystick or other input device) is categorized as user input received via the unified graphical user interface (step 528).

In step 528, input information is gathered from use of a graphical user interface and will be used for interpretation of the user input, potentially spawning multiple effectual actions and events as a result of the user input. The input information may include raw input coordinate data for activation point(s) of the particular input device(s) used, or a logical input coordinate set for activation point(s) in use on the entirety of the unified graphical user interface.

In step 530, the player-selected coordinates of the activation point(s) of the unified graphical user interface presented on the touch screen (or other input/output devices) are provided to the secondary controller for processing. The secondary controller takes the supplied activated coordinates of the unified graphical user interface and translates (i.e., maps) coordinates in accordance with the layout of the unified graphical user interface to determine whether the player selected a region mapped to a feature of the primary game, the secondary game, neither, or some overlapping region belonging to both. Typically, selected input coordinates within the unified graphical user interface are processed by the secondary controller and determined to be processed by (or to be routed to) the primary or secondary controller accordingly. When input to a primary graphical user interface occurs, coordinates are generally converted to a "native" coordinate system of the primary graphical user interface. Other specific types of particular event generation or coordinate translation processes allow a wide variety of implementable details at this stage.

In step 535, a graphical user interface input event is generated by the secondary controller which specifies the results of the process routing determination and the effect that the input will have upon the games in play and gaming machine as a whole. Specifically, this graphical user interface input event will distinguish each differing type of "soft" key input (i.e., graphical user interface button selection) from all others. For example, mapping player input to a primary game graphical user interface "Max Bet Spin" button may generate a "Max Bet Spin" event, or the "Select Lines" primary game graphical user interface button triggers an event causing the number of lines in play to change, etc. Similarly, the secondary controller generates events for the secondary games and all the associated virtual buttons therewith. Each of the buttons may map to unique events which are used to conduct and control game play of the primary and/or secondary games.

In step 540, a determination is made as to whether the event which has been triggered is intended for a function of processing performed by the primary controller. An event intended for the primary controller may be a result of activation of a soft button on the primary graphical user interface correlating to an action exclusively handled by the primary controller. Examples may include actuation of the "Pay Table" or "HELP" buttons associated with the primary game. Typically, if the secondary controller determines an input in a selected region of the screen relating solely to the primary game, the input is routed to the primary controller using a set of native coordinates corresponding to the actuated region obtained through translation/transformation of the input coordinates.

In step 545, if the event is appropriate for the secondary controller to process, a determination is made as to whether the event is a "Game Start" event which requires a mechanical component actuation of the gaming machine, as discussed prior.

In step 550, if the event is not a "Game Start" event which requires the primary controller to perform a given function (e.g., another event which does not specifically require routing of a command to the primary content controller), the secondary controller performs the appropriate function in regard to the secondary game(s) as indicated by the input/event. For instance, one such input/event may include bet control for a secondary game, and/or an actuation of a "Pay Table", or "HELP" soft button associated with one or more secondary game(s). Further, actuation of the "COLLECT" soft button may simply terminate the secondary game and stop processing of the secondary controller altogether, after the appropriate accounting and/or game state writing processes to persistent memory as required by regulation or design.

Once the appropriate secondary game function is performed and completed by the secondary controller (associated to the triggered event), flow returns to presentation of the unified graphical user interface and the gaming machine waits for further user input (i.e., step 520) to continue with the gaming cycle.

However, if, in step 540, it is determined that the event is intended for the primary controller, the event is forwarded to the primary controller for processing. This may include issuance of one or more commands by the secondary controller to the primary controller via the API.

Similarly, if, in step 545, the event is determined to be a "Game Start" event requiring the secondary controller to request at least one mechanical component of the gaming machine to conduct the secondary game, the event is forwarded or issued to the primary controller. This transfer of event may occur in a number of varying ways, including issuing commands directly using the primary controller API to effect control of mechanical component(s) of the gaming machine as discussed prior. Alternatively, other functions as defined in the API may be used to transfer control to (or request action of) the primary controller and its associated services.

Returning to the reception of user input detailed in step 525, step 555 is performed when user input is received via physical buttons of the gaming machine. That is, in response to a button of the gaming machine being actuated, a process may be performed by the primary controller as a result of the secondary controller configured with event subscriptions and interceptive capabilities as detailed prior. The primary controller is able to process this input to control the gaming machine in various ways, including mechanical component actuation, for the primary game and/or the secondary game(s).

In step 560, a button input event is generated by the primary controller specifying an event associated with the actuated button. As above, this event will distinguish each differing type of button input from all others (provided the functions of the buttons are distinct). For example, pressing the gaming machine button related to the primary game "Max Bet Spin" function may generate a "Max Bet Spin" event, or pressing a button relating to a primary game "Select Lines" event may cause the number of lines in play to change, etc. Each of the gaming machine buttons may map to unique events used to conduct and control game play of the primary game and/or the secondary game(s), depending upon implementation of secondary controller and overall gaming design.

In step 565, a determination is made as to whether the generated button event is a secondary controller subscribed event. If so, the event is routed to the secondary controller for processing, and the process continues in step 540 under direct control of the secondary controller. When the event is not a secondary controller subscribed event, this indicates that the event is intended for processing by the primary controller. The primary controller determines the type of event and any appropriate or programmed process(es) performed as a result of a particular triggered event which is not forwarded or rerouted to the secondary controller.

In a case where there is no associated process assigned to be performed by the primary controller and/or the secondary controller in response to a given event, the input may be simply ignored by the primary controller. This may occur when the secondary controller is in complete control of all of the gaming functions and a button actuation/event occurs which is unknown to the secondary controller processes or is undefined along with any associated input event.

Other triggered events may also be specified at this stage of the process 500, including events which have been determined to be specifically intended for the primary game executing on the primary controller (step 540). Further, an API call by the secondary controller in response to a "Game Start" event which requires the secondary controller to actuate at least one mechanical component of the gaming machine to conduct/complete the secondary game (step 545) is also processed by the primary controller at this stage.

Further events are generated as a result of calls to the API which call for mechanical actuation of gaming machine component(s).

In step 570, a determination is made by the primary processor as to whether the event due for processing is actuating a mechanical component of the machine.

In step 575, if the event is not a "Game Start" event (or another event which causes a "Game Start" event chain or some other initiated actuation of mechanical components of the gaming machine), the primary controller performs the appropriate function in regard to the primary game. As above, this may include actuation of bet control, "Pay Table", or "HELP" physical buttons of the gaming machine which does not cause the primary game to initiate and actuate physical components of the gaming machine. Further, actuation of a physical "COLLECT" button may simply terminate the primary game and stop processing of the secondary controller altogether, after appropriate accounting and/or game state writing processes and/or information transfer occurs to a persistent memory, as required by regulation or design. In the event that the primary gaming process is not terminated in this fashion, the process flow returns to a state where the unified graphical user interface is presented to the user and the gaming machine awaits player input once again (step 520).

However, when the event (and/or API function calls on behalf of the secondary controller) indicates actuation of mechanical components of the gaming machine, the mechanical service of the primary game machine are accessed and controlled, as detailed prior. In the event that the secondary controller is controlling mechanical actuation of components, exchanges of information between the primary controller and secondary controller may occur as a result of the interrogation.

In step 580, the primary controller actuates the mechanical component(s) of the gaming machine as appropriate. This process is detailed above in reference to FIG. 3. In one embodiment, an asynchronous message scheme is used which begins with a single request message spawning several response messages upon completion of various phases of actuation completion. One such embodiment provides distinct messages from the mechanical service indicating the mechanical parts are moving and stopping. Other embodiments may include the return of "stop values" as detailed prior.

In step 590, after actuation of the mechanical component(s) terminates, the current gaming cycle is finalized and completed. This may involve each respective controller performing tasks which terminate the overall cycle of the primary and secondary game(s). This may additionally include further "bonus rounds", sounds and animation, reporting of associated wins for all games, etc. Further, the writing of game states and accounting totals may be required to conform to various regulations. When completed, both the primary and secondary games may be restored to an initial state which permits initiation of one or more of the primary and/or secondary games again (i.e., a new gaming cycle). In many cases, this returns flow of the process to step 520 to prompt the player to play another game or provide other input.

As mentioned prior, because the secondary controller may be operationally independent from the primary game and primary gaming machine, the secondary controller may generate a secondary game and secondary graphical user interface which has no knowledge of details of the primary game, primary gaming machine, or any operational details of either. In a more typical implementation, the secondary controller is developed to interact with one or more specific primary gaming machines and associated components while conforming to one or more standardized models of configuration. This may include video and audio output and messaging methodologies, enabling the unified graphical user interface to provide interaction with both primary game and secondary game control functions.

In general, the primary controller (and the executing primary game) is completely oblivious to any specific operations of the secondary controller, any secondary graphical user interface in use, and any operational details of secondary games instantiated by the secondary controller. In one embodiment, the primary controller reacts to the secondary controller calls to the API as if the calls are coming from the primary controller itself. In one embodiment, the operations of the primary controller may not be altered or modified by the secondary controller in any way other than the superficial modification of presentation data through output devices, specifically audio and video output.

In one embodiment, the primary game and the primary controller operate completely independently and functionally unaltered by the secondary controller, other than the presentation modification of video and audio output. The secondary controller may further modify output to include additional content, and provides input coordinate transforming of the modified output screen(s) back to the native coordinate system generated and expected by the primary controller. Thus, operation and presence of the secondary controller, including presence and operation of the secondary controller, resultant manipulation of output by the secondary controller, and input coordinate translation performed by the secondary controller are completely indeterminable by (and irrelevant to) the primary controller in many embodiments.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system comprising:

a display device;

an input device configured to detect a physical item associated with a monetary value that establishes a credit balance; and game-logic circuitry including a primary controller and a secondary controller, the primary controller configured to:

receive an initiation input indicative of a wager covered by the credit balance to initiate and play a primary wagering game, in response to the initiation input, actuate a mechanical outcome indicator in a first instance to display an outcome of the primary wagering game, and in response to a cashout input, initiate a payout from the credit balance; and the secondary controller configured to:

receive a secondary game user input;

in response to the secondary game user input, generate a command causing the primary controller to actuate the mechanical outcome indicator in a second instance to display an outcome associated with a secondary game; and generate modified output data for display on the display device by processing graphics data for the primary wagering game to include secondary graphics data.

2. The gaming system of claim 1, wherein the secondary game user input occurs via a secondary graphical user interface generated by the secondary controller.

3. The gaming system of claim 1, wherein the secondary game user input occurs via actuation of a physical button.

4. The gaming system of claim 1, wherein the primary controller receives an event subscription list from the secondary controller that specifies an event corresponding to the secondary game user input.

5. The gaming system of claim 1, wherein the primary controller generates graphics data for a primary graphical user interface including graphics data for the primary wagering game and the secondary controller generates, for the secondary game, graphics data for a secondary graphical user interface including secondary graphics data, the modified output data including the graphics data of the primary graphical user interface and the secondary graphical user interface being simultaneously displayed on the display device as a unified graphical user interface.

6. The gaming system of claim 5, wherein the unified graphical user interface is generated by the secondary controller according to a defined layout.

7. The gaming system of claim 6, wherein all input received via the unified graphical user interface is processed by the secondary controller.

8. The gaming system of claim 1, wherein the secondary game is executed by the secondary controller.

9. The gaming system of claim 1, wherein the mechanical outcome indicator includes symbol bearing mechanical reels or a rotatable mechanical wheel.

10. A computer-implemented method in a gaming system having one or more electronic input devices, a display device, and game-logic circuitry including a primary controller and a secondary controller, the method comprising the steps of:

detecting, via at least one of the one or more electronic input devices, a physical item associated with a monetary value that establishes a credit balance;

receiving, by the primary controller, an initiation input via at least one of the one or more electronic input devices indicative of a wager covered by the credit balance to initiate and play a primary wagering game, in response to the initiation input, actuating a mechanical outcome indicator in a first instance to display an outcome of the primary wagering game;

receiving, by the primary controller, a cashout input via at least one of the one or more electronic input devices initiating a payout from the credit balance;

receiving, by the secondary controller, a secondary game user input;

in response to the secondary game user input, generating a command by the secondary controller causing the primary controller to actuate the mechanical outcome indicator in a second instance to display an outcome associated with a secondary game; and generating, by the secondary controller, modified output data for display on the display device by processing graphics data for the primary wagering game to include secondary graphics data.

11. The method of claim 10, further comprising the steps of:

generating, by the primary controller, graphics data for a primary graphical user interface including the graphics data for the primary wagering game;

generating, by the secondary controller, graphics data for a secondary graphical user interface for the secondary game including the secondary graphics data; and generating, by the secondary controller, a unified graphical user interface on the display device including the graphics data for the primary graphical user interface and the secondary graphical user interface.

12. The method of claim 11, further comprising the step of the secondary controller receiving the secondary game user input via the unified graphical user interface.

13. The method of claim 10, further comprising the step of the secondary controller receiving the secondary game user input in response to an actuation of a physical button.

14. The method of claim 11, further comprising the step of processing, by the secondary controller, all input received via the unified graphical user interface.

15. The method of claim 14, further comprising the steps of:

in response to user input received via the unified graphical user interface corresponding to the primary game, routing a primary controller event for the primary game to the primary controller; and in response to user input received via the unified graphical user interface corresponding to the secondary game, routing a secondary controller event for the secondary game to the secondary controller.

16. The method of claim 10, wherein the mechanical outcome indicator includes symbol bearing mechanical reels or a rotatable mechanical wheel.

17. A computer-implemented method in a gaming system having one or more electronic input devices and game-logic circuitry, at least one of the one or more electronic input devices configured to detect a physical item associated with a monetary value that establishes a credit balance and the game-logic circuitry including a primary controller and a secondary controller, the primary controller configured to control actuation of a mechanical outcome indicator for a wagering game in response to an input indicative of a wager covered by the credit balance initiating the wagering game, the method comprising:

receiving, by the primary controller, an event list request from the secondary controller;

in response to the receiving, sending, by the primary controller, a list of events to the secondary controller;

subscribing, by the secondary controller, to an event in the list of events;

in response to the event, forwarding, by the primary controller, the event to the secondary controller;

in response to the forwarding, generating, by the secondary controller, a command causing the primary controller to actuate the mechanical outcome indicator; and receiving, by the primary controller via at least one of the one or more electronic input devices, a cashout input that initiates a payout from the credit balance.

18. The method of claim 17, further including in response to the generating, displaying on a display device an outcome associated with a secondary game based upon the mechanical outcome indicator.

19. The method of claim 17, wherein the event is a button press event responsive to actuation of a physical button.

20. The method of claim 17, wherein the mechanical outcome indicator includes symbol bearing mechanical reels or a rotatable mechanical wheel.

* * * * *